United States Patent
Wu et al.

(10) Patent No.: US 7,116,718 B2
(45) Date of Patent: Oct. 3, 2006

(54) UNIFIED MEMORY ADDRESS GENERATION SYSTEM AND METHOD FOR FETCHING AND STORING MPEG VIDEO DATA

(75) Inventors: Qiong Wu, Los Gatos, CA (US); Kwok K. Chau, Los Altos, CA (US); Hau-Yung Chen, Saratoga, CA (US)

(73) Assignee: NJR Corporation, San Jose, CA (US)

( * ) Notice: Subject to any disclaimer, the term of this patent is extended or adjusted under 35 U.S.C. 154(b) by 626 days.

(21) Appl. No.: 10/242,320

(22) Filed: Sep. 11, 2002

(65) Prior Publication Data

US 2004/0057522 A1    Mar. 25, 2004

(51) Int. Cl.
*H04N 7/12* (2006.01)
(52) U.S. Cl. .................................... 375/240.26
(58) Field of Classification Search ........... 375/240.01, 375/3, 13–15, 240.2, 22, 240.25, 240.26; H04N 7/12
See application file for complete search history.

(56) References Cited

U.S. PATENT DOCUMENTS

| | | | | |
|---|---|---|---|---|
| 5,842,123 A | * | 11/1998 | Hamamoto et al. | 455/412.2 |
| 5,940,874 A | * | 8/1999 | Fulcomer | 711/217 |
| 6,111,615 A | * | 8/2000 | Oh et al. | 348/714 |
| 6,442,085 B1 | * | 8/2002 | Fragano et al. | 365/201 |
| 6,647,518 B1 | * | 11/2003 | Asmanis | 714/707 |
| 2003/0014616 A1 | * | 1/2003 | Makphaibulchoke et al. | 712/300 |
| 2003/0174549 A1 | * | 9/2003 | Yaguchi et al. | 365/200 |

* cited by examiner

*Primary Examiner*—Young Lee
(74) *Attorney, Agent, or Firm*—Perkins Coie LLP

(57) ABSTRACT

A method and apparatus is provided for generating various binary addresses for use in decoding MPEG video data. One or more n-bit counters and mutiplexers are used to generate such binary addresses. Different binary addresses can be generated by the same n-bit counter by swapping the bits of the n-bit counter. The number of different binary addresses that an n-bit counter can generate is n factorial.

12 Claims, 20 Drawing Sheets

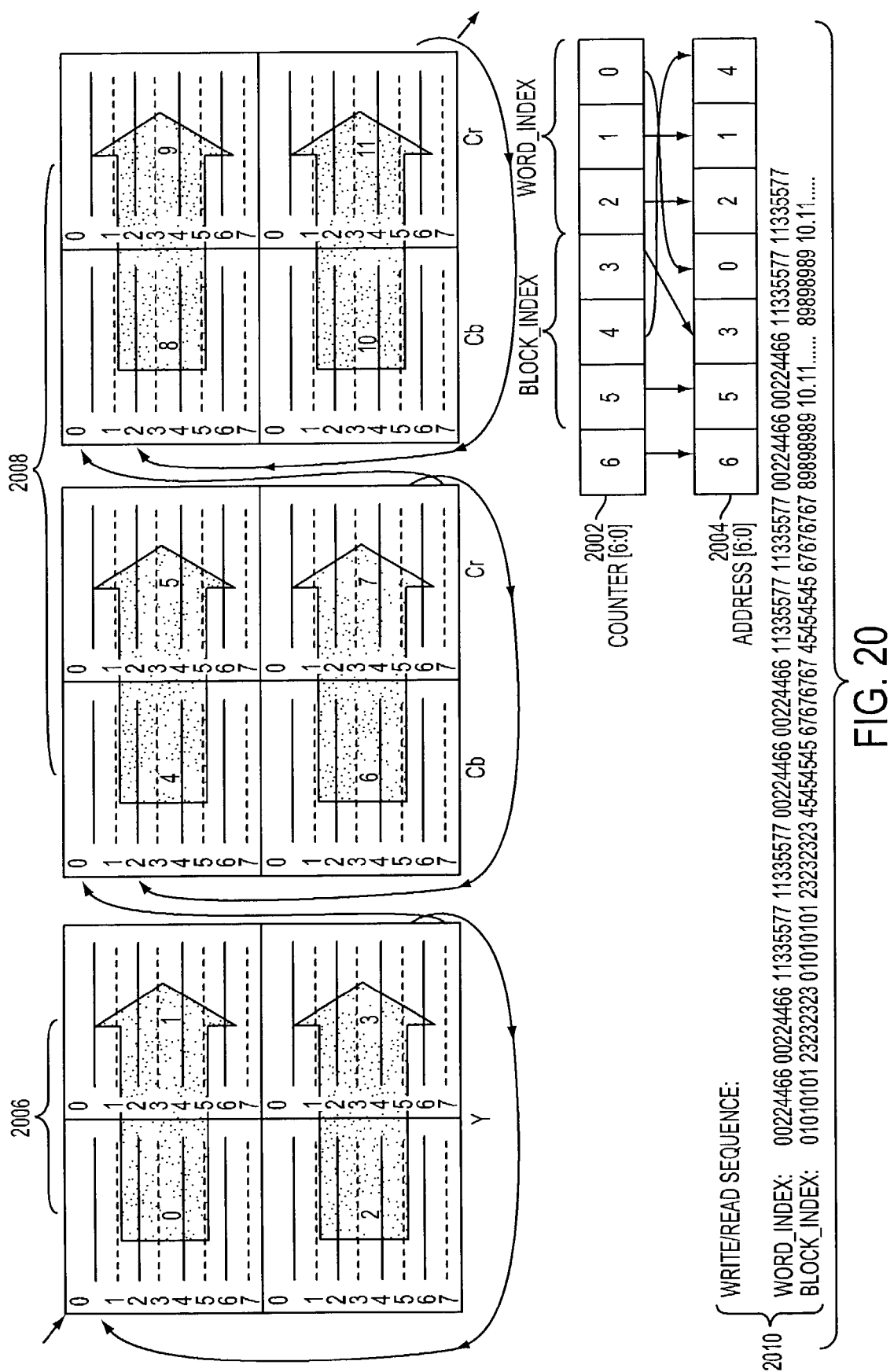

UNIFIED MEMORY ADDRESS GENERATION SYSTEM AND METHOD FOR FETCHING AND STORING MPEG VIDEO DATA

FIELD OF THE INVENTION

This invention relates to MPEG video technology and, more specifically, to decoding Motion Picture Experts Group (MPEG) video bitstream.

BACKGROUND OF THE INVENTION

In MPEG technology, the compressed digital system signal, or bitstream, which includes a video portion, an audio portion, and other informational portions, is transmitted to a receiver. Transmission may be over existing television channels, cable television channels, satellite communication channels, and the like.

A decoder is provided at the receiver to de-multiplex, decompress and decode the received system signal in accordance with a given compression algorithm. The decoded video and audio information is then output to a display device such as a television monitor for presentation to the user.

Video and audio compression and encoding is performed by suitable encoders which implement a selected data compression algorithm that conforms to a recognized standard or specification agreed to among the senders and receivers of digital video signals. Highly efficient compression standards have been developed by the Moving Pictures Experts Group (MPEG), including MPEG-1 and MPEG-2. The MPEG standards enable several VCR-like viewing options such as Normal Forward, Play, Slow Forward, Fast Forward, Fast Reverse, and Freeze.

The MPEG specification defines a hierarchical data structure in the video portion of the bitstream. A video sequence includes a sequence header, one or more groups of pictures, and an end-of-sequence code. A group of pictures is a series of one or more pictures intended to allow random access into the sequence.

A picture is the primary coding unit of a video sequence. A picture consists of three rectangular matrices representing luminance (Y) and two chrominance (Cb, Cr) values. The Y matrix has an even number of rows and columns. The Cb and Cr matrices are one-half the size of the Y matrix in each direction (horizontal and vertical). Thus, for every four luminance values, there are two associated chrominance values (one Cb value and one Cr value).

A slice is one or more contiguous macroblocks. Slices are important in the handling of errors. If the bitstream contains an error, the decoder can skip to the start of the next slice.

A macroblock is a 16×16 line section of luminance components and the corresponding chrominance components. A block is an 8×8 set of values of a luminance or chrominance component.

The MPEG standard defines three main types of video pictures:

1. Intracoded pictures (I-pictures) which are coded without reference to any other pictures.
2. Predictive-coded pictures (P-pictures) which are coded using motion-compensated forward prediction from a previous I or P reference picture.
3. Bidirectional predictive-coded pictures (B-pictures) which are coded using interpolated motion compensation from a previous and a future I or P picture.

I pictures are coded using only the Discrete Cosine Transform (DCT) which converts time and space domain into frequency and amplitude domain for the purpose of achieving data compression.

The macroblock is the basic motion compensation unit for P and B pictures. Each macroblock is coded by computing a motion compensation vector which defines the displacement between the macroblock, and the corresponding macroblock in the reference I or P picture(s) from which it is being predicted. If there is little or no motion, the motion compensation vector will not be transmitted.

A comparison macroblock is then generated by displacing the reference macroblock by the amount indicated by the motion compensation vector, which is then subtracted from the macroblock of the P or B picture that is being coded to produce an error signal which corresponds to the difference therebetween. The error signal is then coded using DCT (similar to an intracoded picture) and transmitted with the motion vector. If, however, the error signal is small or zero, no error component is transmitted.

Thus, a predictive coded macroblock (P or B) can consist of only a motion compensation component, only a transform (DCT) coded component, or both.

After motion compensation and DCT coding are performed, the macroblock is quantized, and Variable Length Coded (VLC) to further compress the data bitstream. The macroblocks are then assembled into slices, pictures, groups of pictures and video sequences, multiplexed with associated audio data, and transmitted to a user for decoding and presentation.

The basic idea behind MPEG video compression is to remove spatial redundancy within a video frame and temporal redundancy between video frames. As in JPEG, the standard for still image compression, DCT-based (Discrete Cosine Transform) compression is used to reduce spatial redundancy. Motion- compensation is used to exploit temporal redundancy. The images in a video stream usually do not change much within small time intervals. The idea of motion-compensation is to encode a video frame based on other video frames temporally close to it.

A video stream is a sequence of video frames. Each frame is a still image. A video player displays one frame after another, usually at a rate close to 30 frames per second (23.976, 24, 25, 29.97, 30).

Frames are digitized in a standard RGB format, 24 bits per pixel (8 bits each for Red, Green, and Blue). MPEG-1 is designed to produce bit rates of 1.5 Mb/s or less, and is intended to be used with images of size 352×288 at 24–30 frames per second. This results in data rates of 55.7–69.6 Mb/s.

Frames are divided into 16×16 pixel macroblocks. Each macroblock consists of four 8×8 luminance blocks and two 8×8 chrominance blocks(1 U and 1 V). Macroblocks are the units for motion-compensated compression. Blocks are used for DCT compression. Frames can be encoded in three types: intra-frames (I-frames), forward predicted frames (P-frames), and bi-directional predicted frames (B-frames).

An MPEG-1 video sequence is an ordered stream of bits, with a special bit pattern sequences marking the beginning and ending of a logical section.

Typically, in real-time MPEG video decoders, which are used in today's set-top boxes or DVD players, a decoding algorithm in application-specific integrated circuits (ASIC's) is implemented. In such cases, key functional operations such as Variable Length Decoding (VLD), Inverse Zig-Zag Scan (IZZ), Inverse Quantization (IQ), Inverse Discrete Cosine Transform (IDCT), Motion Compensation (MC) and Merge and Store (MS) are mapped to dedicated hardware, herein referred to as application specific integrated circuits (ASICs) In one approach, the MPEG bitstream that is to be decoded is stored in a DRAM buffer in a decoder system. The MPEG bitstream that is to be decoded is herein referred to as "bitstream".

FIG. 1 is a simplified block diagram that illustrates some components of a typical MPEG-2 video bitstream decoder core. In FIG. 1, reconstructed data 102 is the bitstream that is to be decoded and is shown as an input into the dynamic random access memory (DRAM) interface 104. DRAM interface 104 is communicatively coupled to DRAM buffer 106, MC module 108, VLD/IZZ/Q module 114 and MS module 112. In addition, MC module 108 is communicatively coupled to MC buffer 110, which in turn is communicatively coupled to MS module 112. VLD/IZZ/IQ module 114 is communicatively coupled to IDCT module 116, which in turn is communicatively coupled to IDCT buffer 118.

The data and data paths referred to herein are associated with reconstructed data 102. There are two main data paths for decoding reconstructed data 102: 1) one data path is for spatial data reconstruction, and 2) one data path is for temporal data reconstruction. The spatial data path goes through the VLD/IZZ/IQ module 114 and IDCT module 116, and the resulting data is written into IDCT buffer 118. The temporal data path, which comprises MC module 108, gets reference data from previously reconstructed data stored in memory. The resulting data coming out of MC module 108 is written to MC buffer 110.

In the final steps of data reconstruction, MS module 112 performs the following: 1) reads in spatial data from the IDCT buffer and reads in temporal data from the MC buffer, 2) adds the data that is read from the MC buffer to the data that is read from the IDCT buffer to produce a combined data set of reconstructed data, and 3) writes the combined data set to DRAM buffer 106 where the reconstructed data is stored All the above operations involve data fetch and store in different addressing schemes. The spatial data path is block based or 8×8 based, while the temporal data path is macroblock based or 16×16 based or 16×8 based. Thus, the MS module handles both block based and macroblock based addressing schemes when adding spatial and temporal data together. In addition, there are many flags in the bitstream which make the IDCT/MC buffer accessing mechanism quite complicated.

In one approach, the ASIC implementation of MPEG video decoding, such as the decoding performed by VLD/IZZ/IQ, IDCT, MC and MS modules, is designed using a pipeline architecture. In a pipeline architecture, the IDCT buffer and the MC buffer require different read/write address pattern sequences. Traditionally, each buffer has its own associated address generator in order to simultaneously facilitate data access. The drawback of pipeline architecture is more hardware consumption, which in turn consumes more power.

Therefore, in past approaches, decoders require a large amount of hardware in terms of gate count and power consumption. Because of the higher level of logic complexity, the effort required to test and debug a decoder is also large. Also, the different addressing schemes of each data path in the decoding process require different types address generators.

Based on the foregoing, there is a need for a method or mechanism for unifying addressing schemes used in MPEG decoding.

SUMMARY OF THE INVENTION

A mechanism is provided for decoding video signals. According to one aspect of the invention, an n-bit counter is used to generate up to n factorial (n!) number of distinct bit pattern sequences. One or more of the distinct n! number of bit sequences are selected to create corresponding one or more addressing schemes. The data that is associated with the video signals are fetched and stored using the one or more addressing schemes. The one or more addressing schemes are based on corresponding one or more flags and condition that are associated with data.

According to one feature of the invention, the n-bit counter is used to produced a first sequence of $2^n$ sequential numbers, wherein each of the $2^n$ sequential numbers is associated with a distinct binary value comprising n bits. An mth pair of bits in each binary value is swapped to produce a (m+1)th sequence of $2^n$ number of non-sequential numbers, wherein m equals (n!−1). According to another feature, one or more multiplexers are used to select the one or more n! number of distinct bit pattern sequences.

According to another feature of the invention, when the mth pair of bits in each binary value is swapped, a predetermined combinational logic is applied to the swapped bits.

According to one feature of the invention, the logic of an address generator is simplified by using an n-bit counter, which is the simplest sequence generator, and by swapping bits. Thus, hardware cost is reduced.

BRIEF DESCRIPTION OF THE DRAWINGS

The present invention is illustrated by way of example, and not by way of limitation, in the figures of the accompanying drawings and in which like reference numerals refer to similar elements and in which:

FIG. 20 is a block diagram that illustrates one address pattern sequence that can be used for a 4:4:4 chrominance format.

DETAILED DESCRIPTION OF THE PREFERRED EMBODIMENT

A method and system are described for decoding MPEG video bitstream. In the following description, for the purposes of explanation, numerous specific details are set forth in order to provide a thorough understanding of the present invention. It will be apparent, however, to one skilled in the art that the present invention may be practiced without these specific details In other instances, well-known structures and devices are shown in block diagram form in order to avoid unnecessarily obscuring the present invention.

OPERATIONAL AND FUNCTIONAL OVERVIEW

Figure 1:
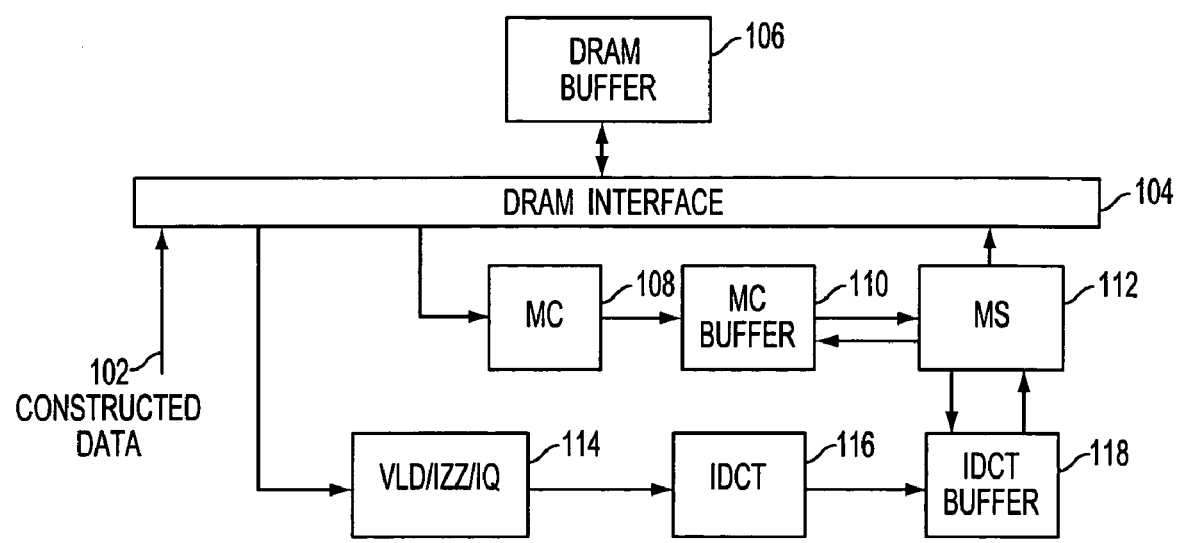
FIG. 1 is a simplified block diagram that illustrates some components of a typical MPEG-2 video bitstream decoder core.

The decoding process as performed by the IDCT module 116, IDCT buffer 118, MC module 108, MC buffer 110 and MS module 112 are described herein with reference to FIG. 1, FIG. 2, FIG. 3 and FIG. 4. Referring to FIG. 1, DRAM buffer is partitioned for constructed (bitstream) data and reconstructed (decoded data) data Constructed data 102 is stored in the DRAM buffer 106 through DRAM interface 104 and is fed to VLD/IZZ/IQ module 114 and IDCT 116 through DRAM interface 104 for decoding. The IDCT 116 processes macroblock data that is associated with constructed data 102. After processing, IDCT 116 writes the macroblock data to IDCT buffer 118 based on coded block pattern. Any current non-coded block in the IDCT buffer will maintain the value of the previous coded block value. Reconstructed data from DRAM buffer 106 are also fed to MC module 108. If motion compensation exists in the macroblock data that is associated with constructed data 102, then MC module 108 retrieves reference data, which is previously reconstructed data that is stored in DRAM buffer 106. MC module 108 processes the macroblock data and writes the macroblock data to MC buffer 110.

MS module 112 reads the macroblock data from IDCT buffer 118 and from MC buffer 110 and adds the macroblock data together before sending the resulting macroblock data back to DRAM buffer 106.

The decoding process performed by IDCT buffer 118, MC buffer 110 and MS module 112 involve multiple read/write events. Each read/write event is associated with a distinct bit pattern sequence based on the different motion compensation modes and residue modes present in the constructed data. In addition, the read/write events are also based on the conditions and/or flags that are associated with the constructed data that is to be decoded. Such conditions and flags are decoded before reconstructing each macroblock of data. Examples of typical motion compensation modes are: 1) frame, 2) field, 3) 8×16, and 4) dual prime. Typical residue modes are: 1) frame, and 2) field. Different read/write address pattern sequences are associated with each mode.

According to certain embodiments of the invention, rather than using several mechanisms to perform the different read/write address pattern sequences associated with each mode, a single unified mechanism is provided to perform the different read/write sequences as performed by IDCT buffer 118, MC buffer 1110 and MS module 112.

Figure 2:
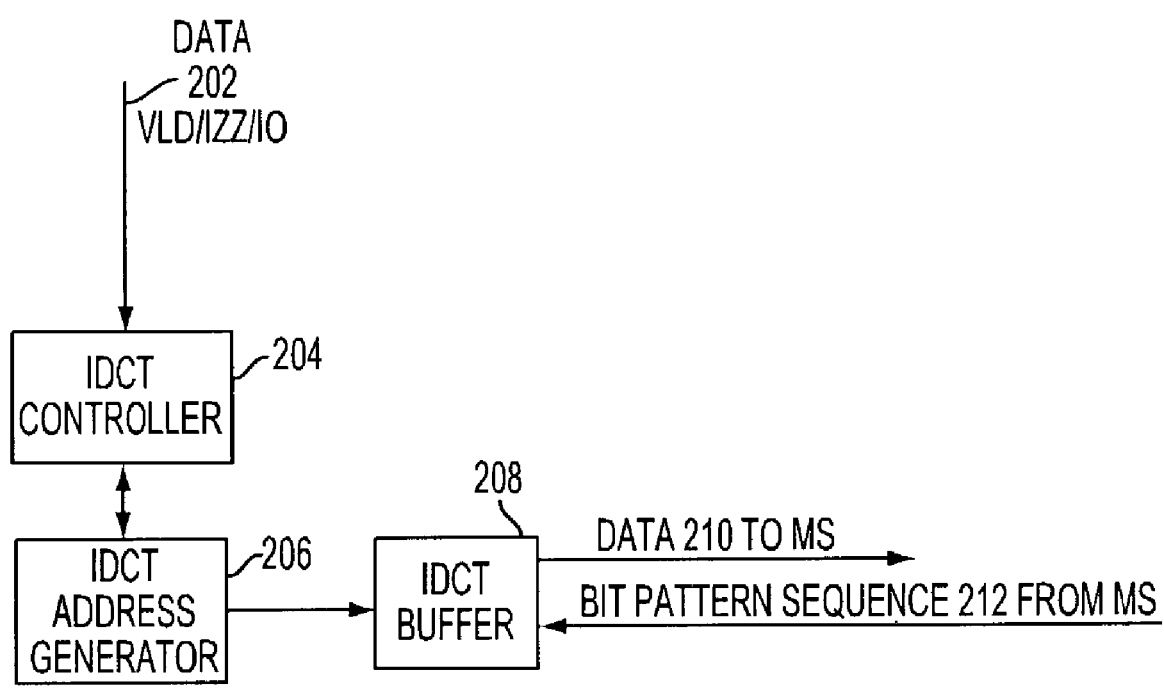
FIG. 2 is a simplified block diagram that illustrates some key components that replace the IDCT module and IDCT buffer of FIG. 1.
Figure 3:
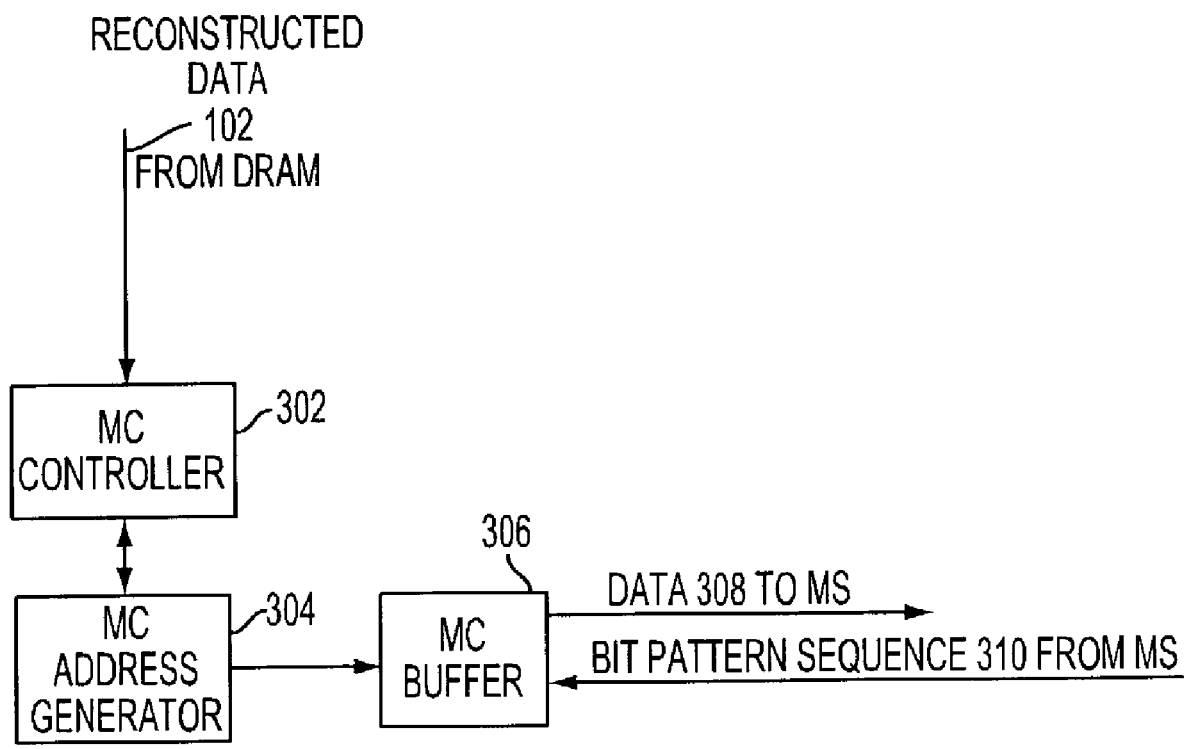
FIG. 3 is a simplified block diagram that illustrates some key components that replace the MC module and MC buffer of FIG. 1.
Figure 4:
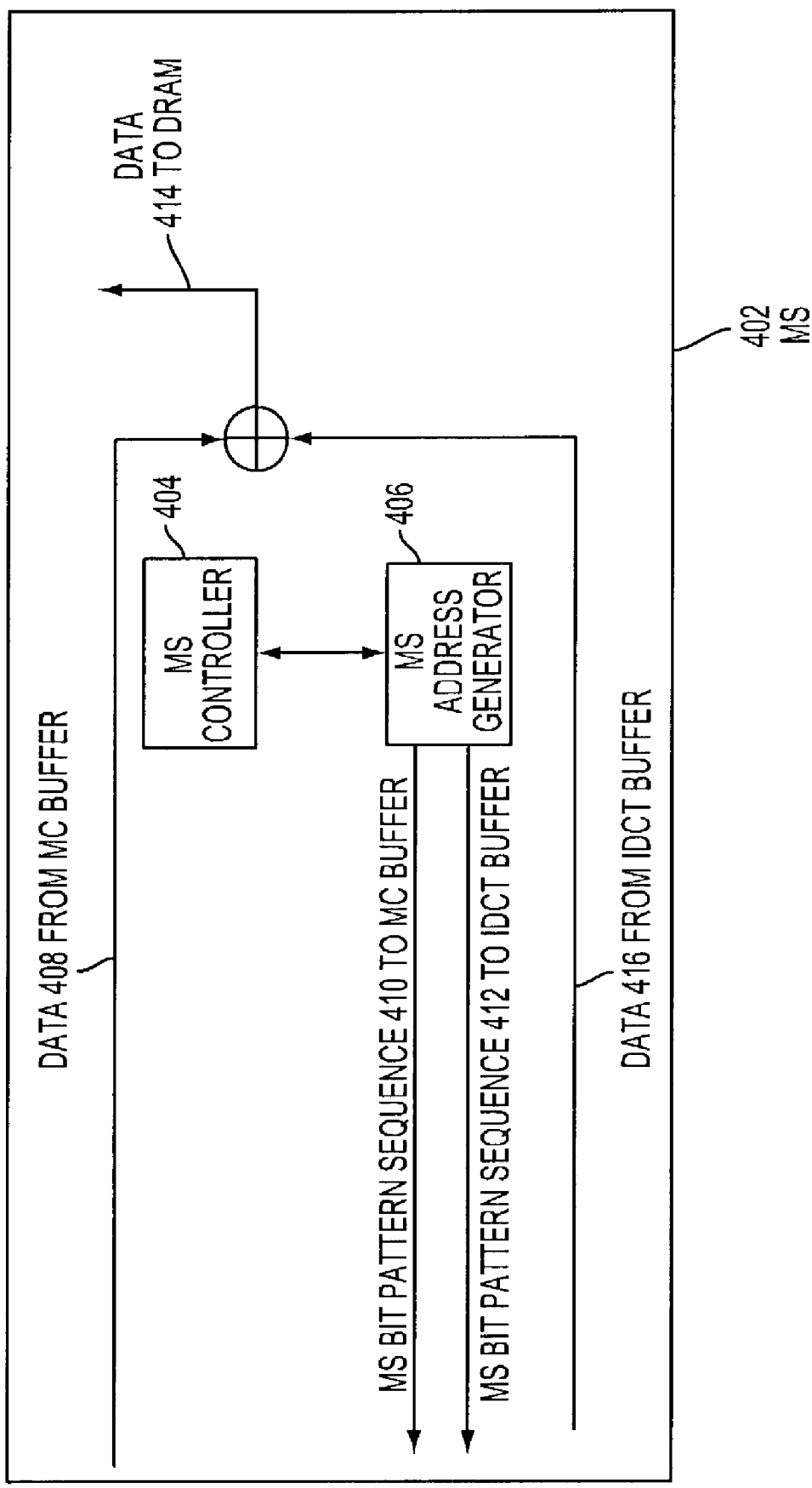
FIG. 4 is a simplified block diagram that illustrates some key components that replace the MS module of FIG. 1.

Some of the important details of the unified mechanism for performing the different read/write sequences, according to certain embodiments of the invention, are described herein with reference to FIG. 2, FIG. 3 and FIG. 4. According to certain embodiments, the unified mechanism for performing the different read/write address pattern sequences is based on using the same type of address generator in the IDCT, MC and MS modules. The address generators use a bit swapping technique for generating the different read/write address pattern sequences and are further described in greater detail herein.

FIG. 2 is a simplified block diagram that illustrates some key components that replace IDCT module 116 and IDCT buffer 118 of FIG. 1. In FIG. 2, data 202 from VLD/IZZ/IQ module feeds into IDCT controller 204. IDCT controller 204 is a controller that is associated with the IDCT address generator 206 and is thus communicatively coupled with IDCT address generator 206. IDCT address generator 206 is communicatively coupled to the IDCT buffer 208. The IDCT buffer receives a bit pattern sequence 212 from an MS module (not shown in FIG. 2) and sends data 210 to the MS module. The function of IDCT address generator 206 is further described in greater detail herein under the section ADDRESS GENERATORS.

FIG. 3 is a simplified block diagram that illustrates some key components that replace MC module 108 and MC buffer 110 of FIG. 1. In FIG. 3, reconstructed data 102 from DRAM buffer feeds into MC controller 302. MC controller 302 is a controller that is associated with the MC address generator 304 and is thus communicatively coupled with MC address generator 304. MC address generator 304 is communicatively coupled to the MC buffer 306. MC buffer 306 receives a bit pattern sequence 310 from the MS module (not shown in FIG. 2) and sends data 308 to the MS module. The function of MC address generator 304 is further described in greater detail herein under the section ADDRESS GENERATOR.

FIG. 4 is a simplified block diagram that illustrates some key components that replace MS module 112 of FIG. 1. In FIG. 4, MS module 402 comprises MS controller 404 that is communicatively coupled to MS address generator 406. MS controller 404 controls MS address generator 406 The MS address generator 406 sends a bit pattern sequence 410 to the MC buffer (not shown in FIG. 4). Also, MS address generator 406 sends bit pattern sequence 412 to the IDCT buffer (not shown in FIG. 4). The function of MS address generator 406 is further described in greater detail herein under the section ADDRESS GENERATOR.

Further, MS module 402 receives data 408 from the MC buffer based on the MS bit pattern sequence 410 and data 416 from the IDCT buffer based on the MS bit pattern sequence 412. Because the MC buffer and the IDCT buffer send data that has bit pattern sequences that are generated by MS address generators that has the same timing, albeit different bit patterns, the MS module only needs one counter to handle data from each buffer. Based on the counter and the conditions (e.g. different modes) and flags decoded from the bitstream, the MS address generator swaps the bits to generate different patterns for both the IDCT buffer and the MC buffer. Thus, MS module 402 needs only one MS address generator to handle data from both the MC buffer and the IDCT buffer.

As shown in FIG. 4, MS module 402 adds data 408 and 416 together to produce data 414, which is sent to the DRAM buffer for storage (DRAM buffer is not shown in FIG. 4).

Address Generator

Figure 5:
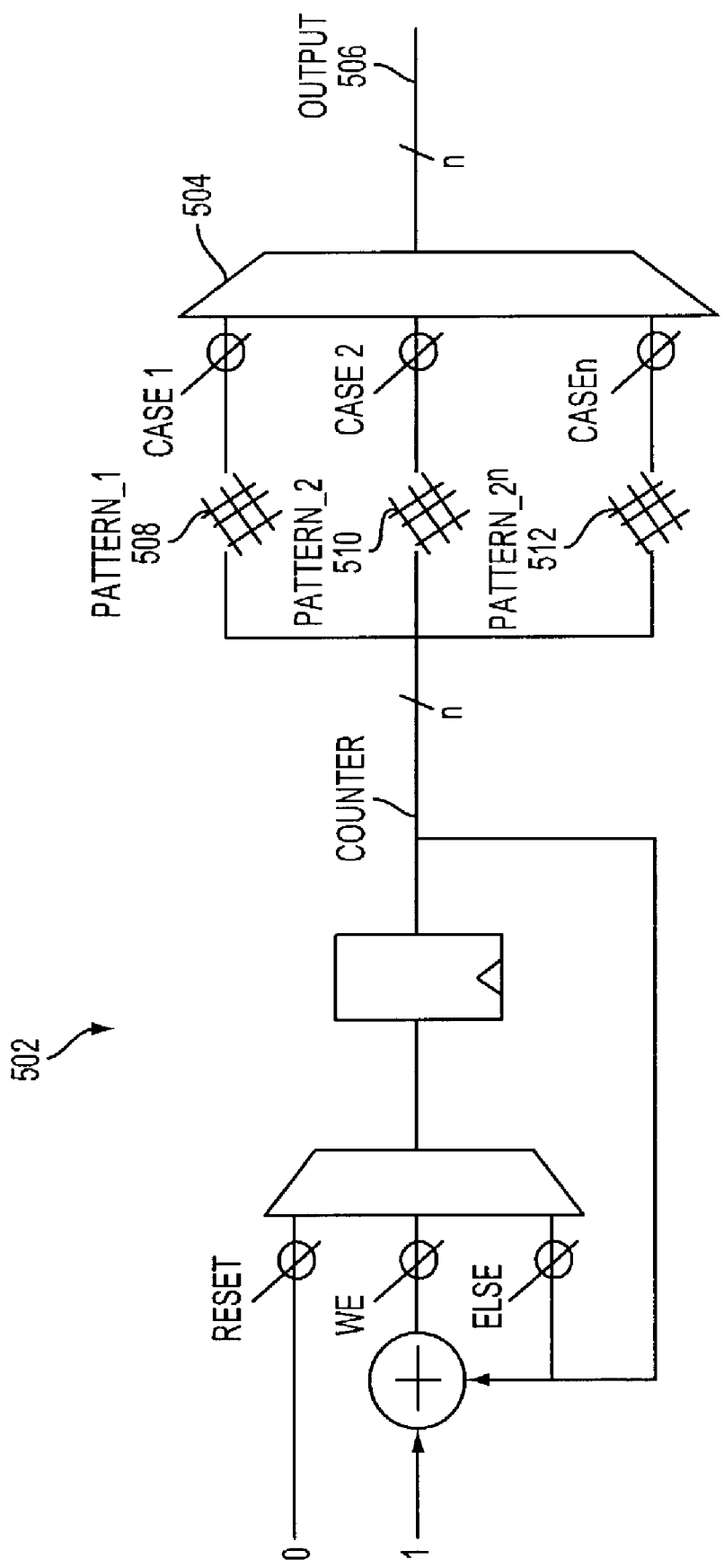
FIG. 5 is a block diagram of an address generator used in certain embodiments of the invention.

FIG. 5 is a block diagram of an address generator used in certain embodiments of the invention. The address generator as shown in FIG. 5 comprises an n-bit counter 502, and a multiplexer 504. The n-bit counter 502 can generate up to $2^n$ numbers that are sequential, for example from 0 to $2^n-1$ with an increment of 1. The $2^n$ numbers can be represented as binary values comprising bits. Each bit has a value of either zero or one. Bits can be swapped to produce up to n! number of bit pattern sequences. Different bit pattern sequences can be used as address pattern sequences that are needed for either IDCT buffer or MC buffer.

In FIG. 5, $2^n$ number of bit pattern sequences are indicated by pattern_1 508, pattern_2 510, up to pattern_$2^n$ 512 as shown in FIG. 5. Through multiplexer 504, which is controlled by an associated controller (not shown in FIG. 5), one of the $2^n$ number of pattern sequences in FIG. 5 is selected as output 506. Such a selection is based upon the conditions and/or flag information that are carried in the reconstructed data, and which are associated with the video signals. In such a case, output 506 is the one of the bit pattern sequences from pattern_1 508 to pattern_$2^n$ 512. Further, the counter's value controls the multiplexer 504 for selecting one of the bit pattern sequences from pattern_1 508 to pattern_$2^n$ 512 as output 506. In such case, the output is composed of different ranges of two or more bit pattern sequences from pattern_1 508 to pattern_$2^n$ 512.

When bits are swapped, the resulting output will no longer remain sequential. Each time the bits are swapped, a new bit pattern sequence is generated. Since n-bit counter 502 has n bits and each bit can be in any position, the total number of possible bit pattern sequences is n! bit pattern sequences. Thus, bit swapping obviates the need for separate dedicated hardware for producing different bit pattern sequences that can be used in addressing schemes needed for either IDCT buffer or MC buffer.

To illustrate, for a 4:2:0 chrominance mode, there are 48 words (6 blocks×8 words=48, each word=8 pixels) in one macroblock. A 6-bit counter is needed to generate 48 bits with sequential values from 0 to 47. The different bit pattern sequences can be generated through the multiplexer by swapping the bits.

Figure 6:
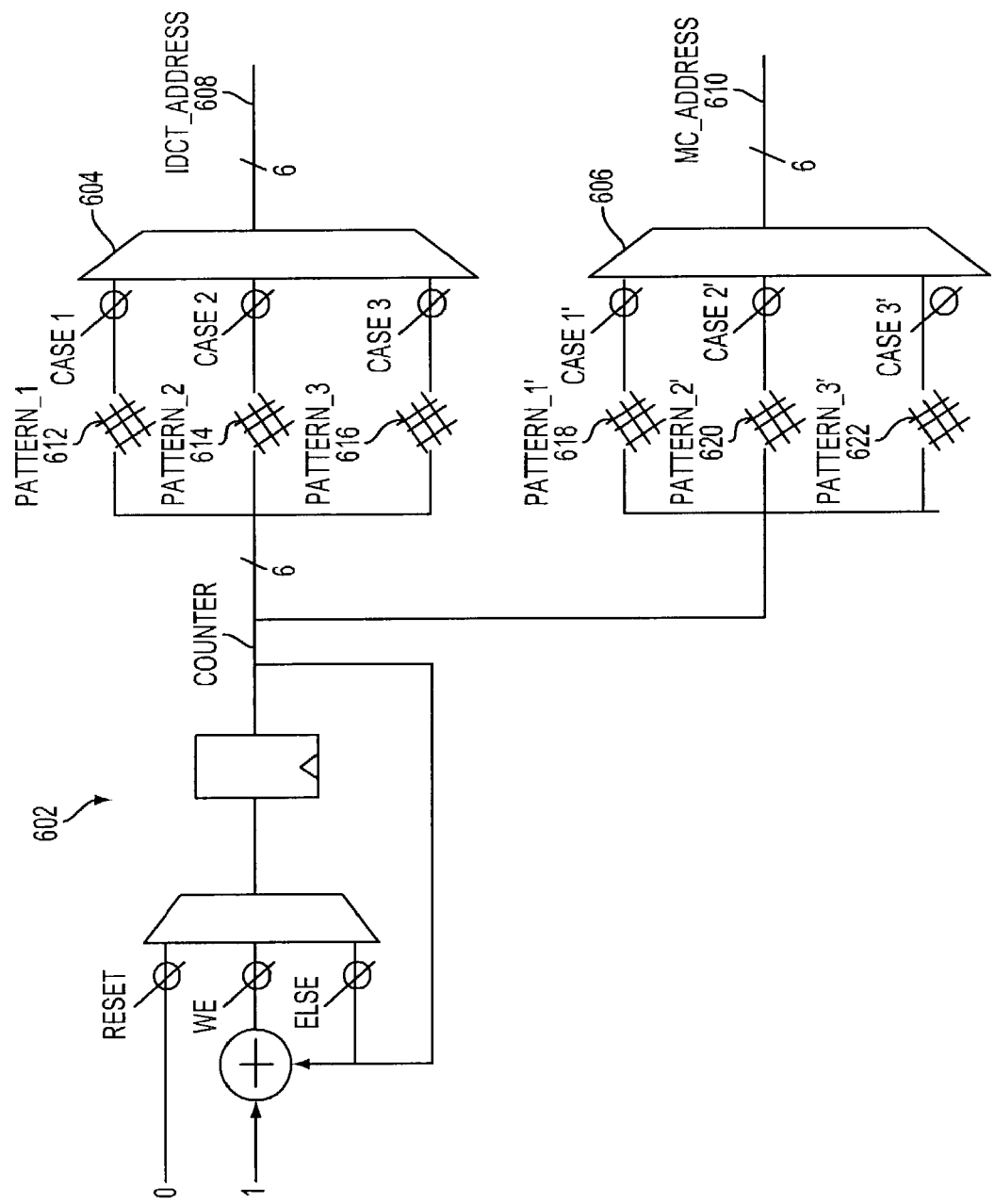
FIG. 6 is a block diagram of another variation of an address generator according to certain embodiments of the invention.

FIG. 6 is a block diagram of another variation of an address generator according to certain embodiments. The address generator as shown in FIG. 6 comprises an n-bit counter 602, and two multiplexers 604, and 606. The n-bit counter 602 can generate up to $2^n$ numbers that are sequential, for example from 0 to $2^n-1$ with an increment of 1. Bits can be swapped to produce up to n! number of bit pattern sequences. Six bit pattern sequences are shown in FIG. 6 and are indicated by pattern1 612, pattern2 614, pattern3 616, pattern1' 618, pattern2' 620, and pattern3' 622. Through multiplexer 604, which is controlled by an associated controller (not shown in FIG. 6), one pattern sequence is selected as output 608 from among pattern1 612, pattern2 614, pattern3 616. Similarly, through multiplexer 606, one bit pattern sequence is selected as output 610 from among pattern1' 618, pattern2' 620, and pattern3' 622. Such a selection is based upon the conditions and/or flag information carried in the reconstructed data.

Thus, because the address generator of FIG. 6 can produce, using one counter, two output bit pattern sequences simultaneously for use in different addressing schemes for decoding video signals, the address generator in FIG. 6 is an example of an MS address generator. In FIG. 6, output 608 is a bit pattern sequence associated with the IDCT addressing scheme and output 610 is a bit pattern sequence that is associated with the MC addressing scheme.

Mathematical Model

The use of an n-bit counter to produce up to n! pattern sequences is based on the mathematical model as described herein. An n-bit counter can generate a sequence of sequential numbers that are expressed as n-bit binary values. The n-bit counter can generate up to $2^n$ memory addresses If mth sequential number produced by the counter may be expressed by the following equation, $$m = b(m,n-1)\cdot 2^{n-1} + b(m,n-2)\cdot 2^{n-2} + \ldots + b(m,1)\cdot 2^1 + b(m,0)\cdot 2^0 \quad \text{EQ-1}$$

where, n is the number of bits in the counter $N=2^n$ is the number memory addresses that the counter can generate k is the bit position index in the counter $\{0, 1, 2, \ldots n-1\}$ i is memory word index $\{0, 1, 2, N-1\}$ b(i, k), where k=$\{0, 1, 2, \ldots n-1\}$, i=$\{0, 1, 2, \ldots N-1\}$, represents the set of coefficients in an equation (similar to EQ-1) that represents the ith sequential number produced by the counter The mth sequential number produced by the counter may also be expressed as vector as follows, $$m = [b(m, n-1) \; b(m, n-2) \; \ldots \; b(m, 1) \; b(m, 0)]_{1\times n} \cdot \begin{bmatrix} 2^{n-1} \\ 2^{n-2} \\ \ldots \\ 2^1 \\ 2^0 \end{bmatrix}_{n\times 1} \quad \text{EQ-2}$$

Thus, the set of sequential numbers that can be generated by a n-bit counter may be expressed as the vector, $\vec{C}$, as follows:

$$\vec{C} = \begin{bmatrix} b(0, n-1) & b(0, n-2) & \ldots & b(0, 1) & b(0, 0) \\ b(1, n-1) & b(1, n-2) & \ldots & b(1, 1) & b(1, 0) \\ \ldots & \ldots & \ldots & \ldots & \ldots \\ b(N-2, n-1) & b(N-2, n-2) & \ldots & b(N-2, 1) & b(N-2, 0) \\ b(N-1, n-1) & b(N-1, n-2) & \ldots & b(N-1, 1) & b(N-1, 0) \end{bmatrix}_{N\times n} \cdot \begin{bmatrix} 2^{n-1} \\ 2^{n-2} \\ \ldots \\ 2^1 \\ 2^0 \end{bmatrix}_{n\times 1} \quad \text{EQ-3}$$

$$= \vec{B} \cdot \vec{E} \quad \text{EQ-4}$$

In EQ-4, $\vec{B}$ is a matrix of the bit values that correspond to the n sequential numbers. Thus, $\vec{B}$ is an N×n matrix. The bit values are binary and therefore comprise either zeros or ones. Each column of the $\vec{B}$ matrix contains N/2 zeroes and N/2 ones. Thus, by swapping of one column with another within the $\vec{B}$ matrix will produce a non-repeating sequence of numbers when $\vec{B} \cdot \vec{E}$. The swapping of columns in the $\vec{B}$ matrix is equivalent to swapping bits in the n-bit counter.

The mathematical expression that is associated with bit swapping is further detailed by the following equations:

The relationship between the original sequence of sequential numbers generated by the n-bit counter and the subsequent sequence of numbers that is generated by swapping bits is as follows.

From EQ-8 and EQ-10, there are three vectors $\vec{C}_1$, $\vec{C}_3$, $\vec{C}_5$ in both $\vec{C}$ and $\vec{C}$. To compare the difference of these two vectors, we do the followings, $$C = \vec{B} \cdot \vec{E} \qquad \text{EQ-5}$$

$$= \begin{bmatrix} b(0,n-1) & b(0,n-2) & \ldots & b(0,s) & \ldots & b(0,t) & \ldots & b(0,1) & b(0,0) \\ b(1,n-1) & b(1,n-2) & \ldots & b(1,s) & \ldots & b(1,t) & \ldots & b(1,1) & b(1,0) \\ \ldots & \ldots & \ldots & \ldots & \ldots & \ldots & \ldots & \ldots & \ldots \\ b(N-2,n-1) & b(N-2,n-2) & \ldots & b(N-2,s) & \ldots & b(N-2,t) & \ldots & b(N-2,1) & b(N-2,0) \\ b(N-1,n-1) & b(N-1,n-2) & \ldots & b(N-1,s) & \ldots & b(N-1,t) & \ldots & b(N-1,1) & b(N-1,0) \end{bmatrix}_{N \times n} \cdot \begin{bmatrix} 2^{n-1} \\ 2^{n-2} \\ \ldots \\ 2^s \\ \ldots \\ 2^t \\ \ldots \\ 2^1 \\ 2^0 \end{bmatrix}_{n \times 1} \qquad \text{EQ-6}$$

$$= \begin{bmatrix} b(0,n-1) & b(0,n-2) & \ldots & b(0,s+1) \\ b(1,n-1) & b(1,n-2) & \ldots & b(1,s+1) \\ \ldots & \ldots & \ldots & \ldots \\ b(N-2,n-1) & b(N-2,n-2) & \ldots & b(N-2,s+1) \\ b(N-1,n-1) & b(N-1,n-2) & \ldots & b(N-1,s+1) \end{bmatrix}_{N \times (n-s-1)} \begin{bmatrix} 2^{n-1} \\ 2^{n-2} \\ \ldots \\ 2^{s+1} \end{bmatrix}_{(n-s-1) \times 1} + \qquad \text{EQ-7}$$

$$\begin{bmatrix} b(0,s) \\ b(1,s) \\ \ldots \\ b(N-2,s) \\ b(N-1,s) \end{bmatrix}_{N \times 1} \cdot [2^s]_{1 \times 1} + \begin{bmatrix} b(0,s-1) & b(0,s-2) & & b(0,t+1) \\ b(1,s-1) & b(1,s-2) & \ldots & b(1,t+1) \\ \ldots & \ldots & & \ldots \\ b(N-2,s-1) & b(N-2,s-2) & \ldots & b(N-2,t+1) \\ b(N-1,s-1) & b(N-1,s-2) & \ldots & b(N-1,t+1) \end{bmatrix}_{N \times (s-t-1)} \begin{bmatrix} 2^{s-1} \\ 2^{s-2} \\ \ldots \\ 2^{t+1} \end{bmatrix}_{(n-s-1) \times 1} +$$

$$\begin{bmatrix} b(0,t) \\ b(1,t) \\ \ldots \\ b(N-2,t) \\ b(N-1,t) \end{bmatrix}_{N \times 1} \cdot [2^t]_{1 \times 1} + \begin{bmatrix} b(0,t-1) & b(0,t-2) & \ldots & b(0,0) \\ b(1,t-1) & b(1,t-2) & \ldots & b(0,1) \\ \ldots & \ldots & \ldots & \ldots \\ b(N-2,t-1) & b(N-2,t-2) & \ldots & b(N-2,0) \\ b(N-1,t-1) & b(N-1,t-2) & \ldots & b(N-1,0) \end{bmatrix}_{N \times n} \cdot \begin{bmatrix} 2^{t-1} \\ 2^{t-2} \\ \ldots \\ 2^0 \end{bmatrix}_{n \times 1}$$

$$= \vec{C}_1 + 2^s \begin{bmatrix} b(0,s) \\ b(1,s) \\ \ldots \\ b(N-2,s) \\ b(N-1,s) \end{bmatrix}_{N \times 1} + C_3 + 2^t \begin{bmatrix} b(0,t) \\ b(1,t) \\ \ldots \\ b(N-2,t) \\ b(N-1,t) \end{bmatrix}_{N \times 1} + C_5 \qquad \text{EQ-8}$$

Similar with vector $\vec{C}$, here is the expression of vector $\vec{C}$, $$\vec{C} = \vec{B} \cdot \vec{E} \qquad \text{EQ-9}$$

$$= \vec{C}_1 + 2^s \begin{bmatrix} b(0,t) \\ b(1,t) \\ \ldots \\ b(N-2,t) \\ b(N-1,t) \end{bmatrix}_{N \times 1} + \vec{C}_3 + 2^t \begin{bmatrix} b(0,s) \\ b(1,s) \\ \ldots \\ b(N-2,s) \\ b(N-1,s) \end{bmatrix}_{N \times 1} + \vec{C}_5 \qquad \text{EQ-10}$$

$$\vec{C} - \vec{C} = 2^s \begin{bmatrix} b(0,s) \\ b(1,s) \\ \ldots \\ b(N-2,s) \\ b(N-1,s) \end{bmatrix}_{N \times 1} + 2^t \begin{bmatrix} b(0,t) \\ b(1,t) \\ \ldots \\ b(N-2,t) \\ b(N-1,t) \end{bmatrix}_{N \times 1} - \left( 2^s \begin{bmatrix} b(0,t) \\ b(1,t) \\ \ldots \\ b(N-2,t) \\ b(N-1,t) \end{bmatrix}_{N \times 1} + 2^t \begin{bmatrix} b(0,s) \\ b(1,s) \\ \ldots \\ b(N-2,s) \\ b(N-1,s) \end{bmatrix}_{N \times 1} \right) \quad \text{EQ-11}$$

$$= (2^s - 2^t) \begin{bmatrix} b(0,s) - b(0,t) \\ b(1,s) - b(1,t) \\ \ldots \\ b(N-2,s) - b(N-2,t) \\ b(N-1,s) - b(N-1,t) \end{bmatrix}_{N \times 1} \quad \text{EQ-12}$$

Let's stop here and have a more close look at each column of $\vec{B}$. For the column k (k is the column index), value transition(0–1–0) is every each $2^k$ rows. It is known the total rows are $2^n$. If the consecutive 0's or 1's are called group, then the number of groups G in one column has the following equations, $$G \cdot 2^k = 2^n \quad \text{EQ-13}$$

$$G = 2^{n-k} \quad \text{EQ-14}$$

The smaller column index, the more groups in one column.

For the column s and column t(s>t), their total rows are equal, so the group ratio can be get from following equations, $$G_s \cdot 2^s = G_t \cdot 2^t \quad \text{EQ-15}$$

-continued $$\frac{G_t}{G_s} = 2^{s-t} \quad \text{EQ-16}$$

In other words, in each zero group or one group of column s, there are $2^{s-t}$ zero group and one group in column t, the number of zero group, and the number of one group are same, each is $2^{s-t-1}$. From EQ-12, inside the matrix is that column t is subtracted from column s The results are either 0, −1 or 1. So each rows of $\vec{C} - \vec{C} = \{0, (2^s-2^t), -(2^s-2^t)\}$. The rows having 0's means that after swapping column s and column t, the rows maintain same values; the rows having $(2^s-2^t)$ means that after swapping columns, the rows' values added with $(2^s-2^t)$; the rows having $-(2^s-2^t)$ means that after swapping columns, the rows subtracted with $-(2^s-2^t)$.

Let's take a more close look at column s and column t.

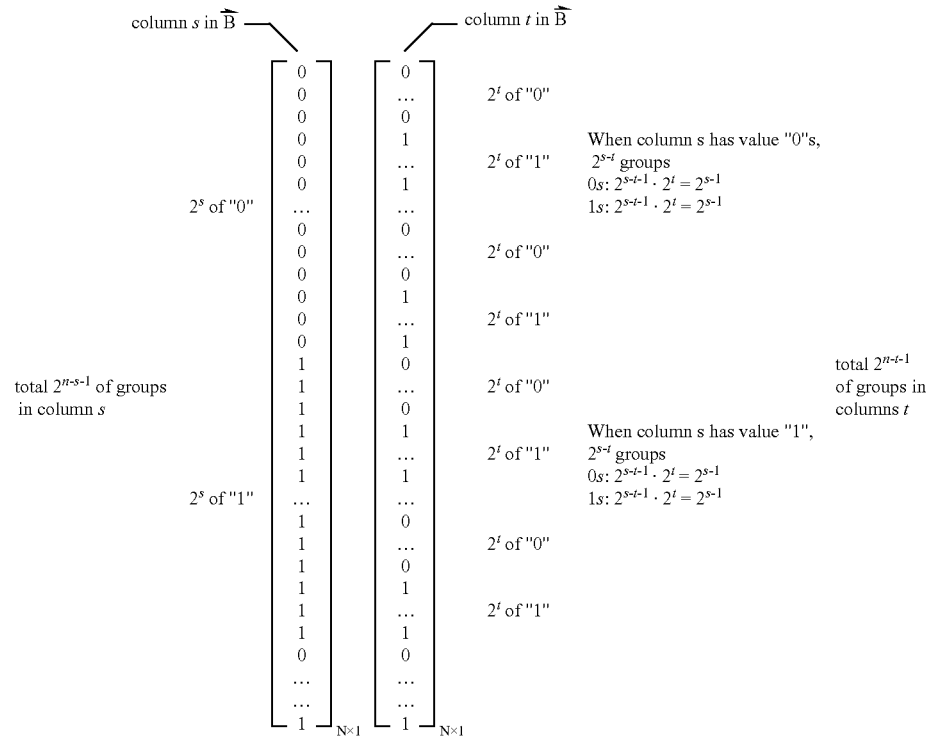

Based above analysis of column s and column t, continuously derive equation EQ12 as following in EQ17, $$\vec{C} - \vec{C} = (2^s - 2^t) \begin{bmatrix} 0-0 \\ \cdots \\ 0-0 \\ 0-1 \\ \cdots \\ 0-1 \\ \cdots \\ 0-0 \\ \cdots \\ 0-0 \\ 0-1 \\ \cdots \\ 0-1 \\ 1-0 \\ \cdots \\ 1-0 \\ 1-1 \\ \cdots \\ 1-1 \\ \cdots \\ 1-0 \\ \cdots \\ 1-0 \\ 1-1 \\ \cdots \\ 1-1 \\ 0-0 \\ \cdots \\ \cdots \\ 1-1 \end{bmatrix}_{N \times 1} = (2^s - 2^t) \begin{bmatrix} 0 \\ \cdots \\ 0 \\ -1 \\ \cdots \\ -1 \\ \cdots \\ 0 \\ \cdots \\ 0 \\ -1 \\ \cdots \\ -1 \\ 1 \\ \cdots \\ 1 \\ 0 \\ \cdots \\ 0 \\ \cdots \\ 1 \\ \cdots \\ 1 \\ 0 \\ \cdots \\ \cdots \\ 0 \end{bmatrix}_{N \times 1} \qquad \text{EQ-17}$$

$2^t$ of "0"

$2^t$ of "−1"

$2^{s-t}$ groups $0s: 2^{s-t-1} \cdot 2^t = 2^{s-1}$ $-1s: 2^{s-t-1} \cdot 2^t = 2^{s-1}$ $2^t$ of "0"

$2^t$ of "−1"

$2^t$ of "1"

total $1s: \dfrac{2^{n-t-1}}{4} \cdot 2^t = 2^{n-3}$ total $-1s: \dfrac{2^{n-t-1}}{4} \cdot 2^t = 2^{n-3}$ total $0s: \dfrac{2^{n-t-1}}{2} \cdot 2^t = 2^{n-2}$ $2^t$ of "0"

$2^t$ of "1"

$2^{s-t}$ groups $0s: 2^{s-t-1} \cdot 2^t = 2^{s-1}$ $-1s: 2^{s-t-1} \cdot 2^t = 2^{s-1}$ $2^t$ of "1"

$2^t$ of "0"

From BQ-17, the number of −1's and 1's are same, equal $$2^{n-3} = \frac{N}{4};$$

the number of 0's are $$2^{n-2} = \frac{N}{2};$$

−1's, 1's add together to make N. Corresponding to those rows of 0's, the rows maintain same after swapping columns s and t; corresponding to those rows of −1's, offset $(2^s-2^1)$ will be taken and compensated to those rows of 1's. Overall are balanced. All the value of rows still in the range from 0 to N−1.

Based on above proof of this mathematical model, the conclusion can be made: for the matrix $$\vec{C} = \vec{B} \cdot \vec{E}$$

swapping any two columns s and t of matrix $\vec{B}$, the result of matrix $\vec{C}$ have this character: N/2 of its columns remain same, N/4 of its columns offset $-(2^s-2^1)$, and $(2^s-2^1)$ compensate to the another N/4 rows. The pattern of rows being changed is: in the first $2^s$ rows, skip first $2^1$ rows, every other $2^1$ rows have negative offset $(2^s-2^1)$; this pattern mirrors to the second $2^s$, but the rows had negative offset now have positive offset; this pattern mirrors to the third $2^s$ rows, in other words, the third $2^s$ rows are same to the first $2^s$ rows. It continues until to the last rows. Here $\vec{C}$: 1×N vector $$\vec{B} = \begin{bmatrix} 0 & 0 & \ldots & 0 & 0 \\ 0 & 0 & \ldots & 0 & 1 \\ 0 & 0 & \ldots & 1 & 0 \\ 0 & 0 & \ldots & 1 & 1 \\ \ldots & \ldots & \ldots & \ldots & \ldots \\ 1 & 1 & 1 & 1 & 0 \\ 1 & 1 & 1 & 1 & 1 \end{bmatrix}_{N \times n}$$

$$\vec{E} = \begin{bmatrix} 2^0 \\ 2^1 \\ \ldots \\ 2^{n-2} \\ 2^{n-1} \end{bmatrix}_{n \times 1}$$

$N = 2^{-2}$ s, t: column index, s>t; $0 < s-t \leq n-1$

It can be seen from above, if swap any columns of $\vec{B}$, another new vector of $\vec{C}$ can be generated with above mentioned characters. So to generate a new vector $\vec{C}$ the maximum patterns are n!, since there are n! ways of positioning each columns of $\vec{B}$.

Bit Swappping

For the purpose of explanation, assume a 4-bit counter. The $\vec{B}$ matrix for a 4-bit counter is of size 16×4 and appears as follows.

$$\begin{array}{cccc} \text{col0} & \text{col1} & \text{col2} & \text{col3} \end{array}$$
$$\begin{bmatrix} 0 & 0 & 0 & 0 \\ 0 & 0 & 0 & 1 \\ 0 & 0 & 1 & 0 \\ 0 & 0 & 1 & 1 \\ 0 & 1 & 0 & 0 \\ 0 & 1 & 0 & 1 \\ 0 & 1 & 1 & 0 \\ 0 & 1 & 1 & 1 \\ 1 & 0 & 0 & 0 \\ 1 & 0 & 0 & 1 \\ 1 & 0 & 1 & 0 \\ 1 & 0 & 1 & 1 \\ 1 & 1 & 0 & 0 \\ 1 & 1 & 0 & 1 \\ 1 & 1 & 1 & 0 \\ 1 & 1 & 1 & 1 \end{bmatrix}$$

If $\vec{C}$ represents the sequential numbers that can be produced by the 4-bit counter, then $\vec{C}$=0, 1, 2, 3, 4, 5, 6, 7, 8, 9, 10, 11, 12, 13, 14, 15. The swapping of column 0 (col0) and column 3 (col3) in matrix $\vec{B}$ is equivalent to swapping bits in the 4-bit counter as previously explained herein. By swapping of column 0 and column 3 in matrix $\vec{B}$, a new sequence of numbers is produced. If $\vec{C}'$ represents the new sequence of numbers, then $\vec{C}'$=0, 8, 2, 10, 4, 12, 6, 14, 1, 9, 3, 11, 5, 13, 7, 15.

Thus, $\vec{C} = \vec{B} \cdot \vec{E}$ appears as follows:

swap column 0 and column 3

$$\begin{bmatrix} 0 & 0 & 0 & 0 \\ 0 & 0 & 0 & 1 \\ 0 & 0 & 1 & 0 \\ 0 & 0 & 1 & 1 \\ 0 & 1 & 0 & 0 \\ 0 & 1 & 0 & 1 \\ 0 & 1 & 1 & 0 \\ 0 & 1 & 1 & 1 \\ 1 & 0 & 0 & 0 \\ 1 & 0 & 0 & 1 \\ 1 & 0 & 1 & 0 \\ 1 & 0 & 1 & 1 \\ 1 & 1 & 0 & 0 \\ 1 & 1 & 0 & 1 \\ 1 & 1 & 1 & 0 \\ 1 & 1 & 1 & 1 \end{bmatrix}_{16 \times 4} \cdot \begin{bmatrix} 2^3 \\ 2^2 \\ 2^1 \\ 2^0 \end{bmatrix}_{4 \times 1} = \begin{bmatrix} 0 \\ 1 \\ 2 \\ 3 \\ 4 \\ 5 \\ 6 \\ 7 \\ 8 \\ 9 \\ 10 \\ 11 \\ 12 \\ 13 \\ 14 \\ 15 \end{bmatrix}_{16 \times 1}$$

If $\vec{B}'$ represents the matrix $\vec{B}$ after swapping column 0 and column 3 in matrix $\vec{B}$, then $\vec{C}' = \vec{B}' \cdot \vec{E}$ appears as follows:

$$\begin{bmatrix} 0000 \\ 1000 \\ 0010 \\ 1010 \\ 0100 \\ 1100 \\ 0110 \\ 1110 \\ 0001 \\ 1001 \\ 0011 \\ 1011 \\ 0101 \\ 1101 \\ 0111 \\ 1111 \end{bmatrix}_{16 \times 4} \cdot \begin{bmatrix} 2^3 \\ 2^2 \\ 2^1 \\ 2^0 \end{bmatrix}_{4 \times 1} = \begin{bmatrix} 0 \\ 8 \\ 2 \\ 10 \\ 4 \\ 12 \\ 6 \\ 14 \\ 1 \\ 9 \\ 3 \\ 11 \\ 5 \\ 13 \\ 7 \\ 15 \end{bmatrix}_{16 \times 1}$$

Memory Content and Address Pattern Sequences

Figure 7:
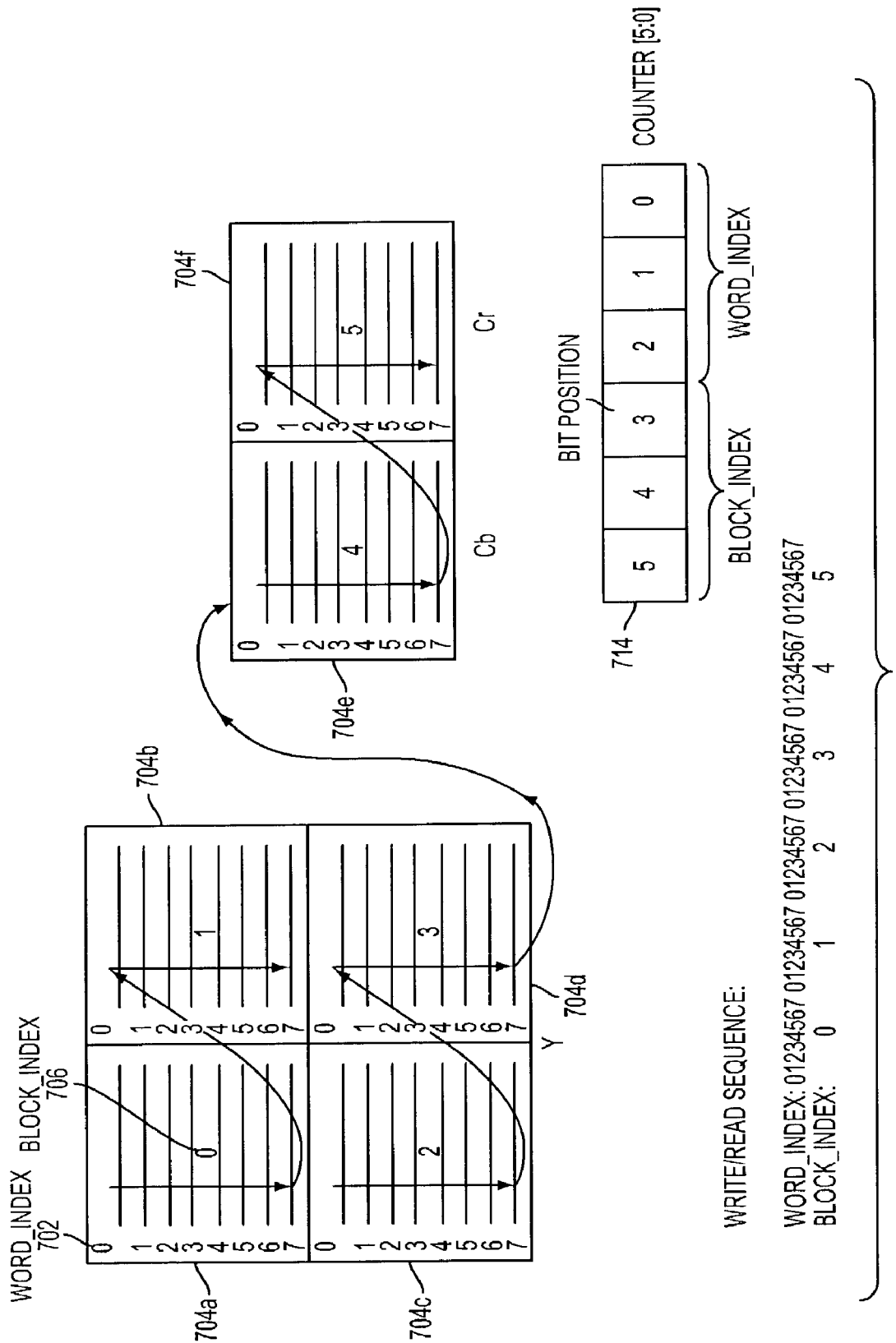
FIG. 7 is a block diagram that illustrates the data format in memory.

FIG. 7 is a block diagram that illustrates the data format in memory. Specifically, the format shown in FIG. 7 is a 4:2:0 chrominance format. In FIG. 7, blocks 704*a*, 704*b*, 704*c*, and 704*d* represent the luminance blocks, Y0, Y1, Y2, Y3. Blocks 704*e*, and 704*f* represent the chrominance blocks Cb and Cr. Blocks 704*a*, 704*b*, 704*c*, 704*d*, 704*e*, and 704*f* make up one macroblock. In each block, each word holds one line or 8 pixels. Each block comprises 8 words. In such a case, a macroblock has 48 words. Thus, the format as shown in FIG. 7 needs a 6-bit counter in order to generate 48 addresses (a 6-bit counter can generate up to $2^6$ addresses). Further, in FIG. 7, bit position display 714 shows the 6 bits of the 6-bit counter. In bit position display 714, the most significant bit (MSB) 3 bits indicate the bits associated with the block_index and the least significant bit (LSB) 3 bits indicate the bits associated with the word_index.

The block index takes the value of the counter's 3 MSB, i.e., counter [5:3]. In the 4:4:4 format, the block index takes the value of the counter's 4 MSB, i.e., counter [6:3]. It is depicted in FIG. 7 in both position and Maroblock/block position as well.

Word index takes the value of counter's 3 LSB, i e., counter [2:0]. It is depicted in FIG. 7 in both position and Maroblock/block position as well.

The description of the block index and word index are similar with respect to all the figures from FIG. 8 to FIG. 20. Furthermore, the description of the block index and word index are similar with respect to all non-sequential sequences that are generated from the swapped counter bits. For convenience, the description of the block index and word index are not repeated in all the figures.

Figure 8:
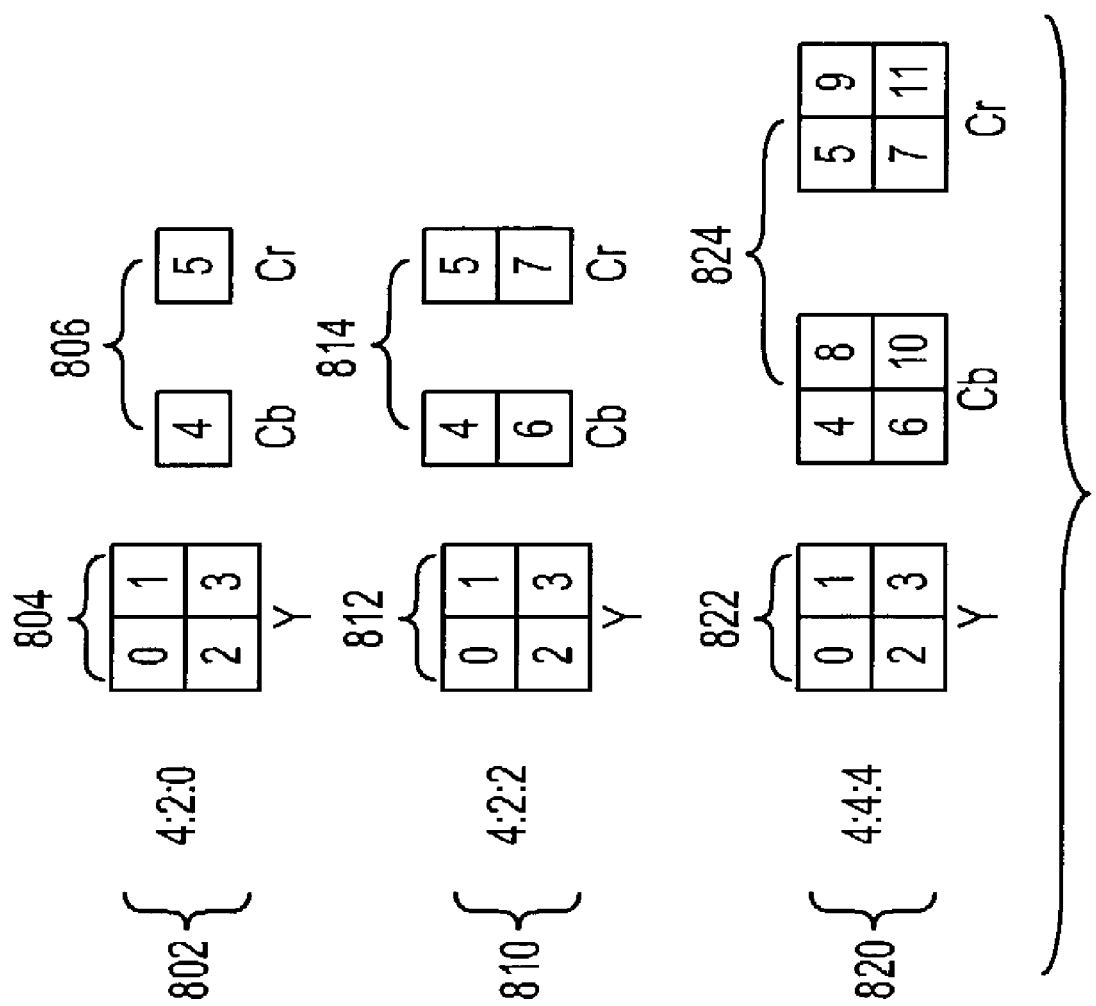
FIG. 8 is a block diagram that illustrates three different chrominance formats for a macroblock.

FIG. 8 is a block diagram that illustrates three different chrominance formats for a macroblock. In FIG. 8, the format 802 is a 4:2:0 chrominance format, format 810 is a 4:2:2 chrominance format, and format 820 is a 4:4:4 chrominance format. In the 4:2:0 chrominance format, blocks 804 are the luminance blocks and blocks 806 are the chrominance blocks. In the 4:2:2 chrominance format, blocks 812 are the luminance blocks and blocks 814 are the chrominance blocks. Similarly, in the 4:4:4 chrominance format, blocks 822 are the luminance blocks and blocks 824 are the chrominance blocks.

Figure 9:
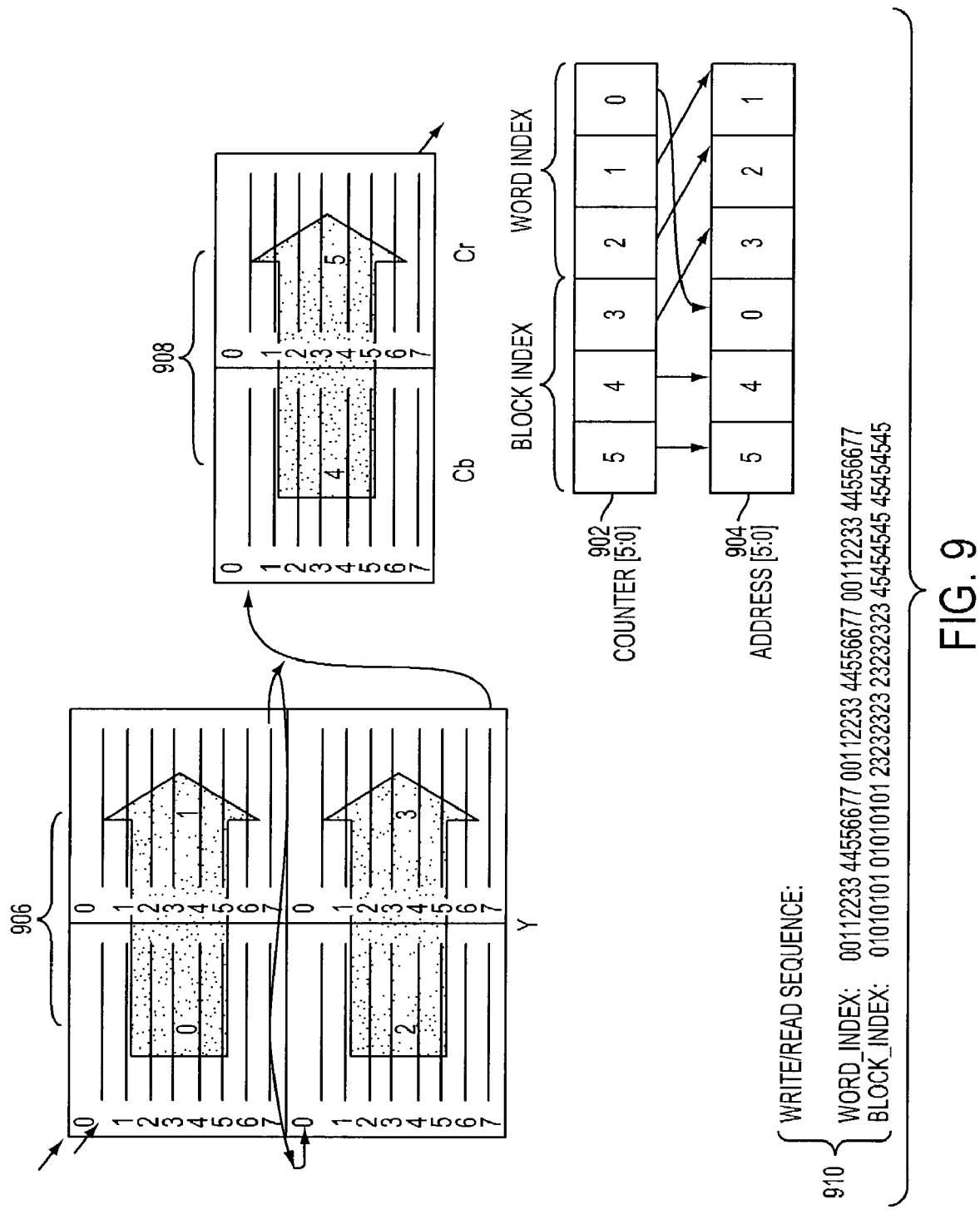
FIG. 9 is a block diagram that illustrates one address pattern sequence that can be used for a 4:2:0 chrominance format.

FIG. 9 is a block diagram that illustrates one address pattern sequence that can be used for a 4:2:0 chrominance format. Blocks 906 are the luminance blocks and blocks 908 are the chrominance blocks. FIG. 9 also shows the counter bits 902, which six bits, from bit position [5] to bit position [0], are swapped to generate address pattern sequence 904. Thus, the six counter bits 902 are rearranged as [5], [4], [0], [3], [2], [1] to generate address pattern sequence 904. Block 910 illustrates the block index and word index of sequence 904 in decimal numbers. Further, FIG. 9 shows the following:

address[5]<=counter[5];
address[4]<=counter[4];
address[3]<=counter[0];
address[2]<=counter[3];
address[1]<=counter[2];
address[0]<=counter[1].

Figure 10:
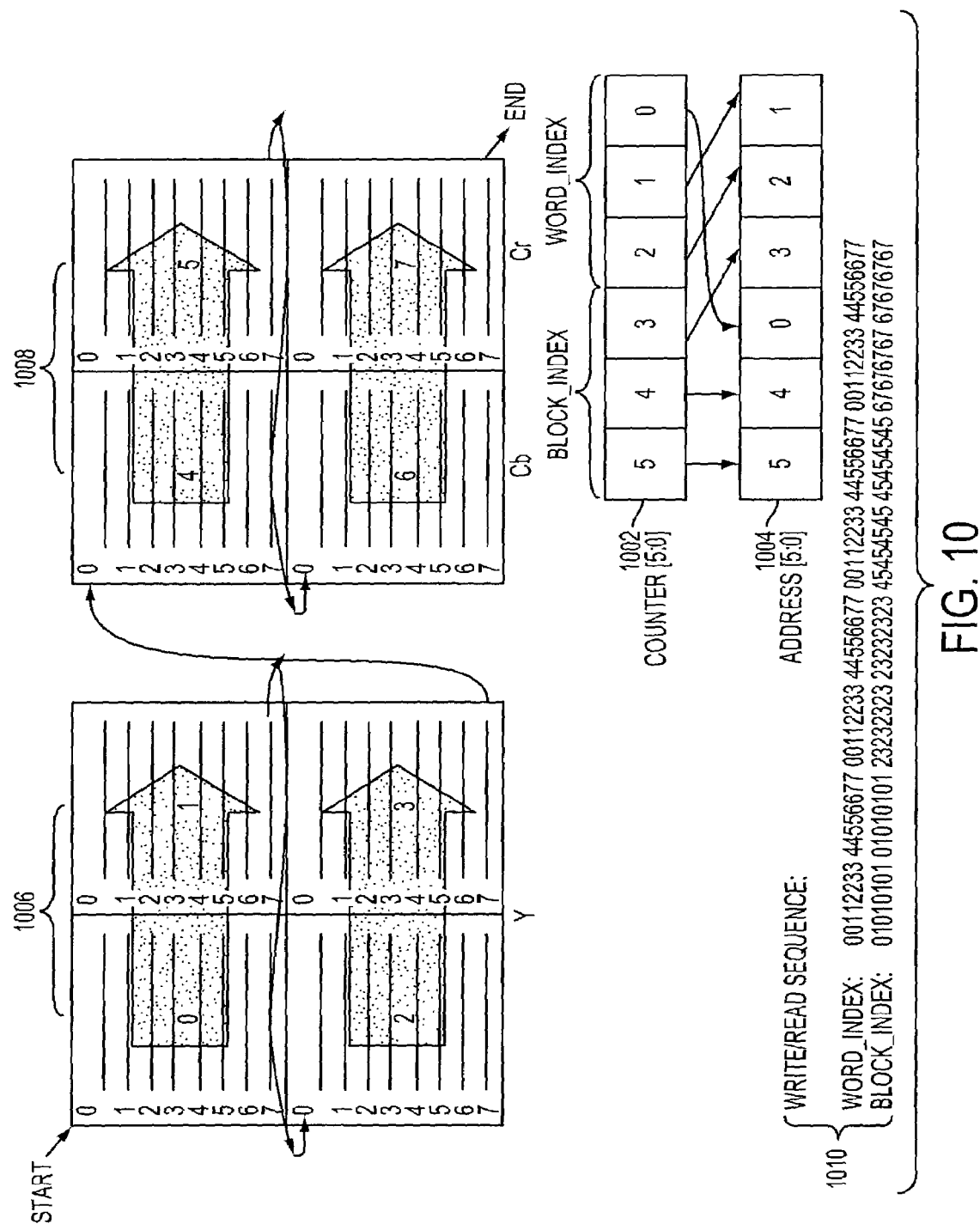
FIG. 10 is a block diagram that illustrates one address pattern sequence that can be used for a 4:2:2 chrominance format.

FIG. 10 is a block diagram that illustrates one address pattern sequence that can be used for a 4:2:2 chrominance format. Blocks 1006 are the luminance blocks and blocks 1008 are the chrominance blocks. FIG. 10 also shows the counter bits 1002, which six bits, from bit position [5] to bit position [0], are swapped to generate address pattern sequence 1004. Thus, the six counter bits 1002 are rearranged as [5], [4], [0], [3], [2], [1] to generate address pattern sequence 1004. Block 1010 illustrates the block index and word index of sequence 1004 in decimal numbers. Thus, FIG. 10 shows the following:

address[5]<=counter[5];
address[4]<=counter[4];
address[3]<=counter[0];
address[2]<=counter[3];
address[1]<=counter[2];
address[0]<=counter[1].

Figure 11:
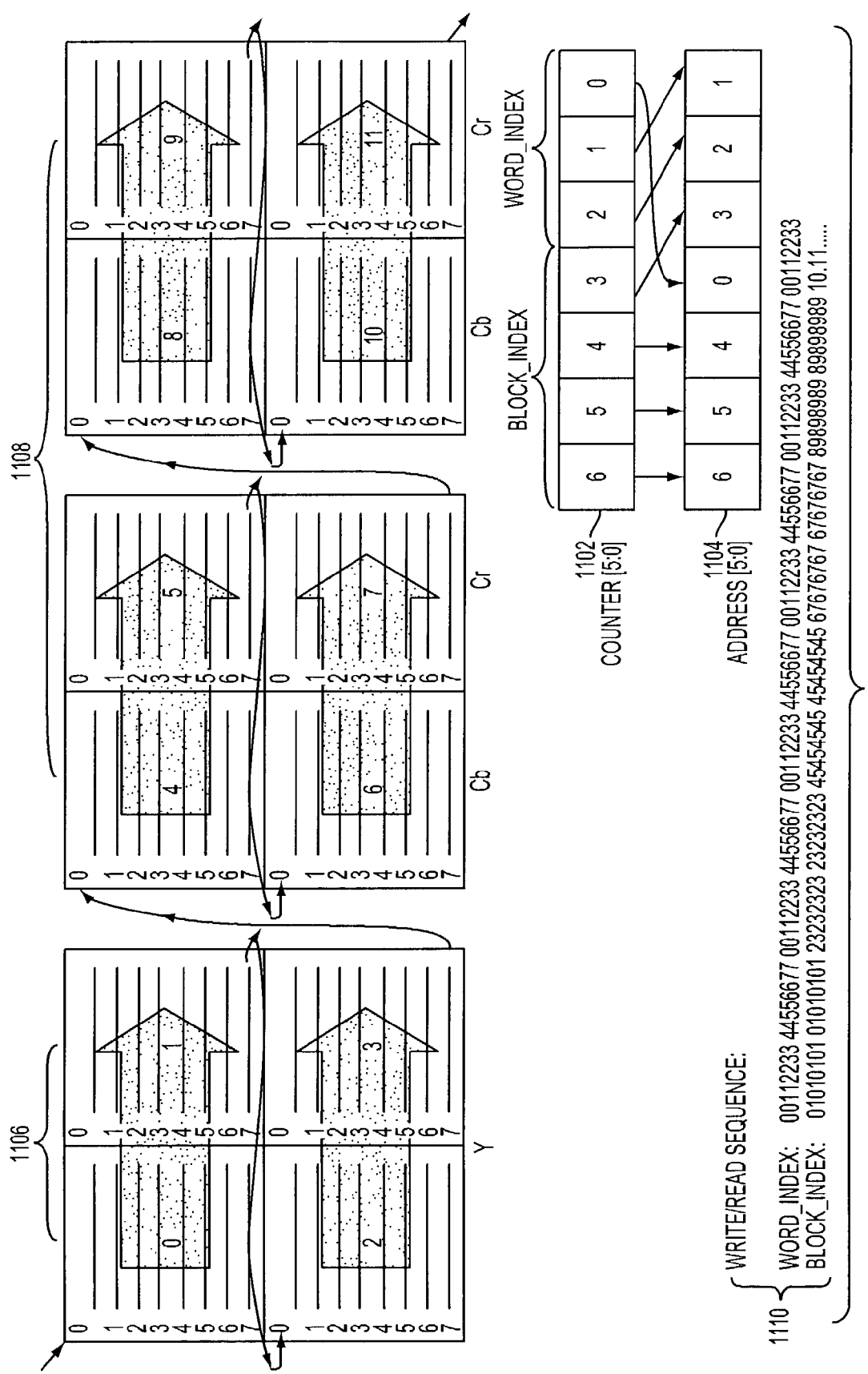
FIG. 11 is a block diagram that illustrates one address pattern sequence that can be used for a 4:4:4 chrominance format.

FIG. 11 is a block diagram that illustrates one address pattern sequence that can be used for a 4:4:4 chrominance format. Blocks 1106 are the luminance blocks and blocks 1108 are the chrominance blocks. FIG. 11 also shows the counter bits 1102, which seven bits, from bit position [6] to bit position [0], are swapped to generate address pattern sequence 1104. Thus, the seven counter bits 1102 are rearranged as [6], [5], [4], [0], [3], [2], [1] to generate address pattern sequence 1104. Block 1110 illustrates the block index and word index of sequence 1104 in decimal numbers. Thus, FIG. 11 shows the following:

address[6]<=counter[6];
address[5]<=counter[5];
address[4]<=counter[4];
address[3]<=counter[0];
address[2]<=counter[3];
address[1]<=counter[2];
address[0]<=counter[1].

A combination of different bit swap pattern s can apply to a sequence in a different data range to create a new non-sequential sequence. In the FIG. 12, FIG. 15 and FIG. 17, the data range originally generated by a counter is called data index in the video decoding application.

Figure 12:
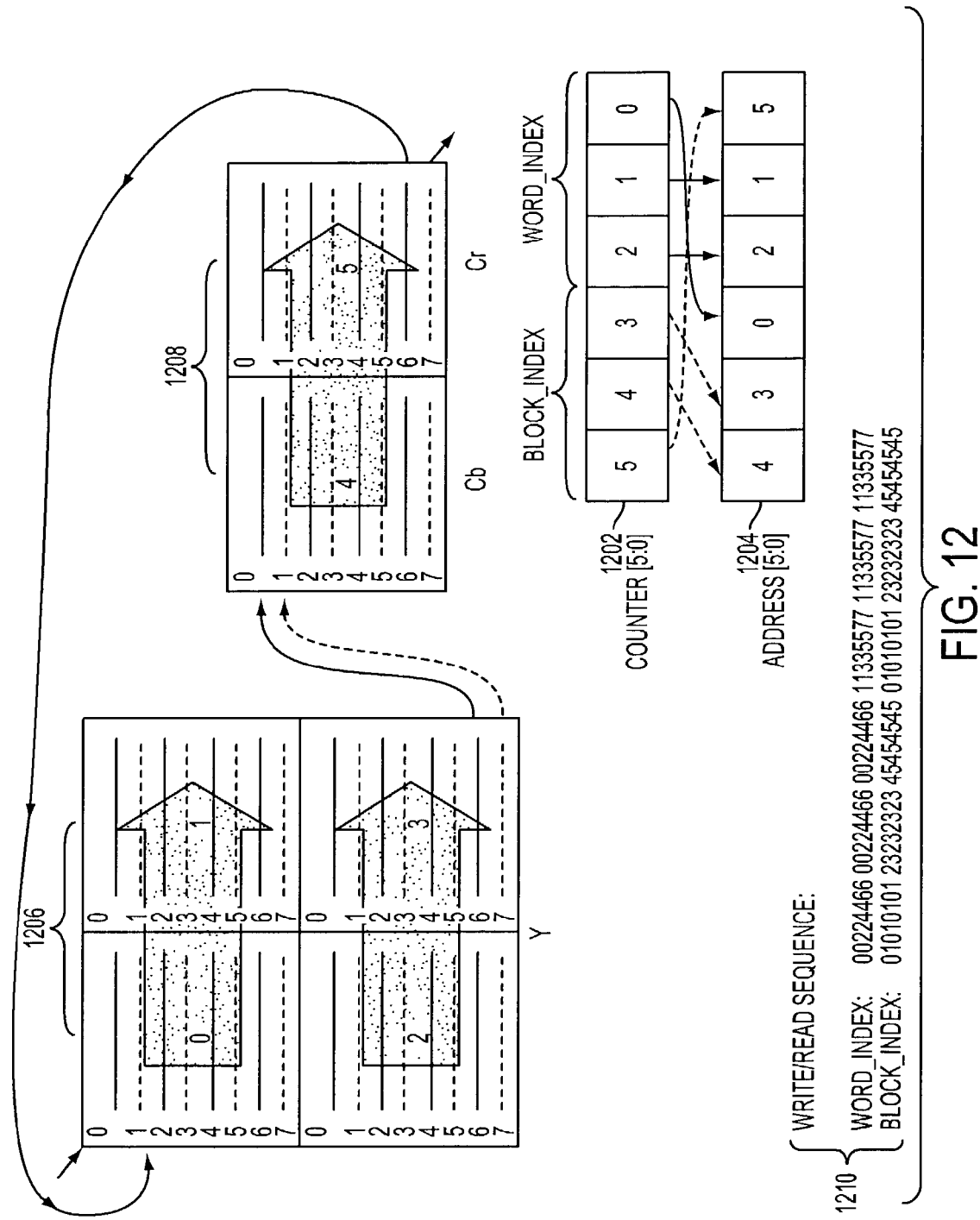
FIG. 12 is a block diagram that illustrates one address pattern sequence that can be used for a 4:2:0 chrominance format.

FIG. 12 is a block diagram that illustrates one address pattern sequence that can be used for a 4:2:0 chrominance format. Block 1206 are the luminance blocks and blocks 1208 are the chrominance blocks. FIG. 12 also shows the counter bits 1202, which bits are swapped to generate address pattern sequence 1204. In FIG. 12, four different bit swap patterns apply to four ranges of sequential sequences generated by a counter. The four ranges are block_index=3, block_index=4, block_index=5 and the remaining, block_index=1, 2, 6.

When counter bits 1202 are in the block_index=3, the six counter bits 1202, from bit position [5] to bit position [0], are swapped to generate address pattern sequence 1204. The following combinational logic is applied to the six counter bits 1202: NOT [4], NOT [3], [0], [2], [1], NOT [5] to generate address pattern sequence 1204.

When counter bits 1202 are in the block_index=4, the six counter bits 1202, from bit position [5] to bit position [0], are swapped to generate address pattern sequence 1204. The following combinational logic is applied to the six counter bits 1202: [4], NOT [3], [0], [2], [1], [5] to generate address pattern sequence 1204.

When counter bits 1202 are in the block_index=5, the six counter bits 1202, from bit position [5] to bit position [0], are swapped to generate address pattern sequence 1204. The following combinational logic is applied to the six counter bits 1202: NOT [4], NOT [3], [0], [2], [1], [5] to generate address pattern sequence 1204.

When counter bits 1202 are in the block_index=1, 2, 6, the six counter bits 1202, from bit position [5] to bit position [0], are swapped to generate address pattern sequence 1204. The six counter bits 1202 are rearranged as: [4], [3], [0], [2], [1], [5] to generate address pattern sequence 1204.

Block 1210 illustrates the block index and word index of sequence 1204 in decimal numbers.

Figure 13:
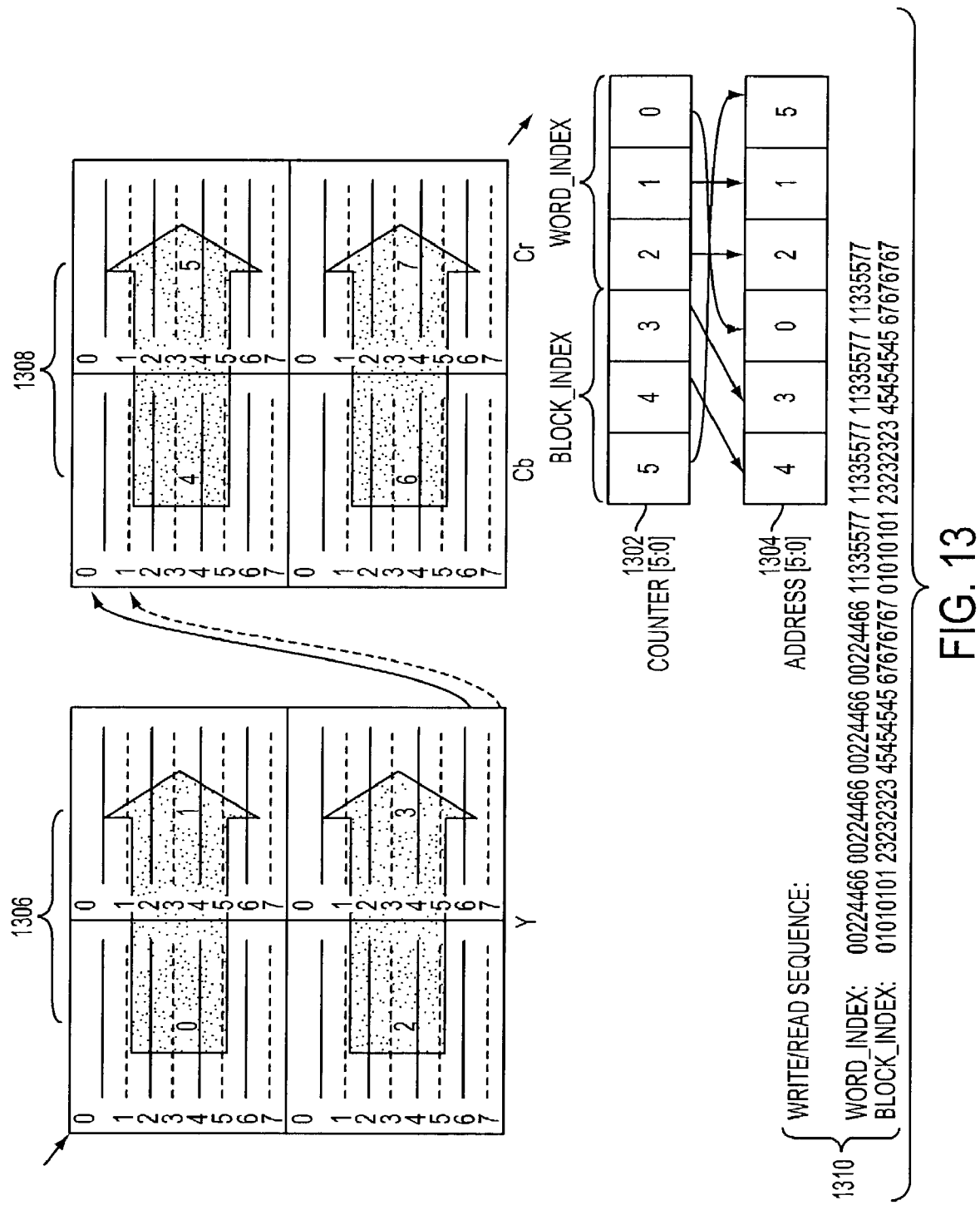
FIG. 13 is a block diagram that illustrates one address pattern sequence that can be used for a 4:2:2 chrominance format.

Thus, with respect to FIG. 12, the following combinational logic applies:

if (counter[5:3]="011")//block_index=3
  address[5]<=not counter[4];
  address[4]<=not counter[3];
  address[3]<=counter[0];
  address[2]<=counter[2];
  address[1]<=counter[1];
  address[0]<=not counter[5];
else if (counter[5:3]="100")//block_index=4
  address[5]<=counter[4];
  address[4]<=not counter[3];
  address[3]<=counter[0];
  address[2]<=counter[2];
  address[1]<=counter[1];
  address[0]<=counter[5];

else if (counter[5:3]="101")//block_index=5
    address[5]<=not counter[4];
    address[4]<=not counter[3];
    address[3]<=counter[0];
    address[2]<=counter[2];
    address[1]<=counter[1];
    address[0]<=counter[5];
else
    address[5]<=counter[4];
    address[4]<=counter[3],
    address[3]<=counter[0];
    address[2]<=counter[2];
    address[1]<=counter[1];
    address[0]<=counter[5];

FIG. 13 is a block diagram that illustrates one address pattern sequence that can be used for a 4:2:2 chrominance format. Block 1306 are the luminance blocks and blocks 1308 are the chrominance blocks. FIG. 13 also shows the counter bits 1302, which six bits, from bit position [5] to bit position [0], are swapped to generate address pattern sequence 1304. Thus, the six counter bits 1302 are rearranged as [4], [3], [0], [2], [1], [5], to generate address pattern sequence 1304. Block 1310 illustrates the block index and word index of sequence 1304 in decimal numbers. Thus, FIG. 13 shows the following:

address[5]<=counter[4];
    address[4]<=counter[3];
    address[3]<=counter[0],
    address[2]<=counter[2];
    address[1]<=counter[1];
    address[0]<=counter[5].

Figure 14:
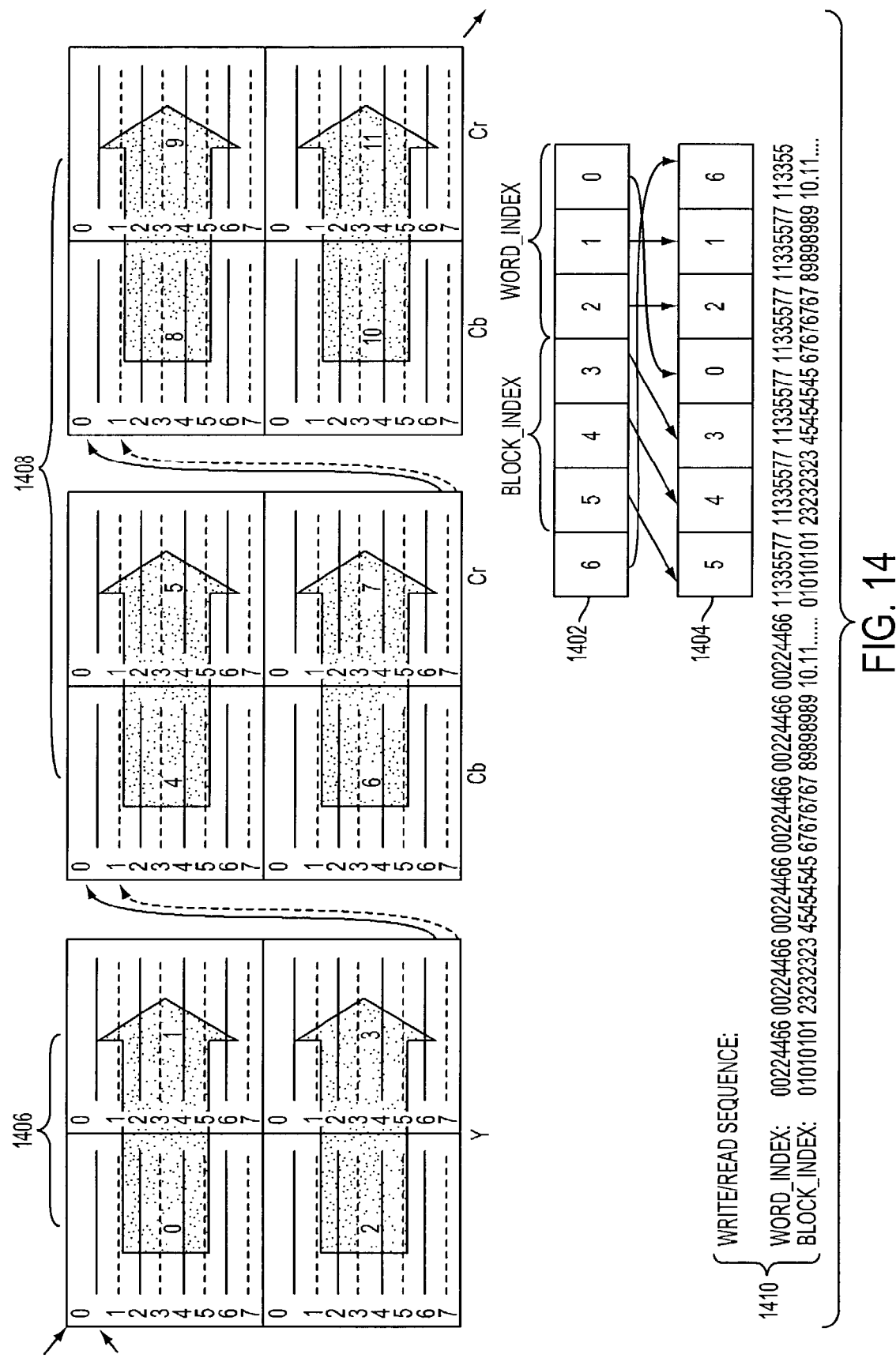
FIG. 14 is a block diagram that illustrates one address pattern sequence that can be used for a 4:4:4 chrominance format.

FIG. 14 is a block diagram that illustrates one address pattern sequence that can be used for a 4:4:4 chrominance format. Block 1406 are the luminance blocks and blocks 1408 are the chrominance blocks. FIG. 14 also shows the counter bits 1402, which seven bits, from bit position [6] to bit position [0], are swapped to generate address pattern sequence 1304. Thus, the seven counter bits 1402 are rearranged as [5], [4], [3], [0], [2], [1], [6] to generate address pattern sequence 1404. Block 1410 illustrates the block index and word index of sequence 1404 in decimal numbers. Thus, FIG. 14 shows the following:

address[6]<=counter[5];
    address[5]<=counter[4];
    address[4]<=counter[3];
    address[3]<=counter[0];
    address[2]<=counter[2];
    address[1]<=counter[1];
    address[0]<=counter[6].

Figure 15:
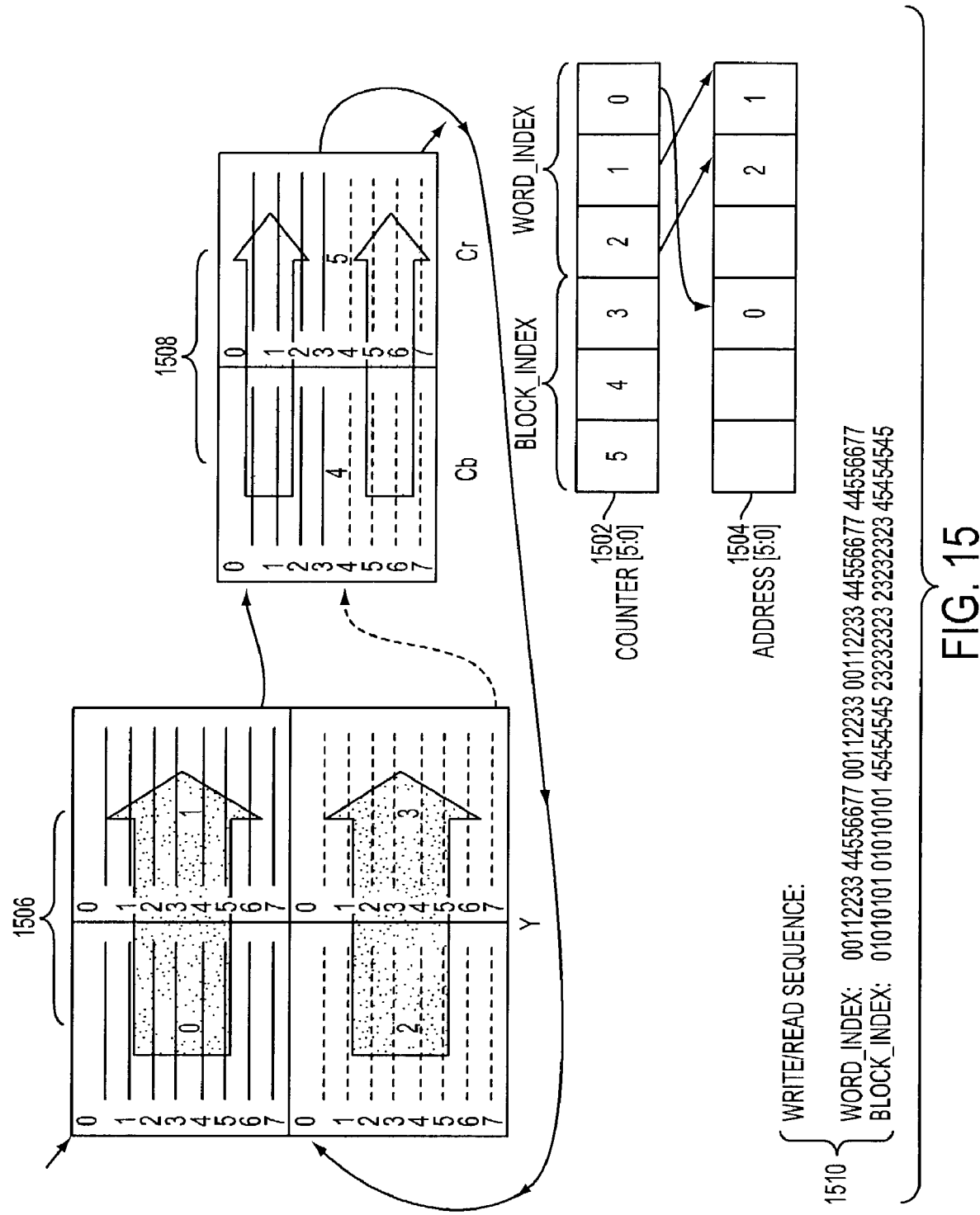
FIG. 15 is a block diagram that illustrates one address pattern sequence that can be used for a 4:2:0 chrominance format.

FIG. 15 is a block diagram that illustrates one address pattern sequence that can be used for a 4:2:0 chrominance format. Block 1506 are the luminance blocks and blocks 1508 are the chrominance blocks. FIG. 15 also shows the counter bits 1502, which bits are swapped to generate address pattern sequence 1504. In FIG. 15, three different bit swap patterns apply to three ranges of sequential sequences generated by a counter. The three ranges are block_index=2, block_index=3, 4, and the remaining, block_index=1, 5, 6.

When counter bits 1502 are in the block_index=2, the six counter bits 1502, from bit position [5] to bit position [0], are swapped to generate address pattern sequence 1504. The six counter bits 1502 are rearranged as: [4], [5], [0], [3], [2], [1] to generate address pattern sequence 1504.

When counter bits 1502 are in the block_index=3, 4, the six counter bits 1502, from bit position [5] to bit position [0], are swapped to generate address pattern sequence 1504. The following combinational logic is applied to the six counter bits 1502: [5], [4], [0], NOT[3], [2], [1] to generate address pattern sequence 1504.

When counter bits 1502 are in the block_index=1, 5, 6, the six counter bits 1502, from bit position [5] to bit position [0], are swapped to generate address pattern sequence 1504. The six counter bits 1502 are rearranged as: [5], [4], [0], [3], [2], [1] to generate address pattern sequence 1504.

Block 1510 illustrates the block index and word index of sequence 1504 in decimal numbers.

Thus, with respect to FIG. 15, the following logic applies:
if (counter[5.3]="010")//block_index=2
    address[5]<=counter[4];
    address[4]<=counter[5];
    address[3]<=counter[0];
    address[2]<=counter[3];
    address[1]<=counter[2];
    address[0]<=counter[1];
else if (counter[5:3]="011"or counter[5:3]="100")//block_index=3,4
    address[5]<=counter[5];
    address[4]<=counter[4];
    address[3]<=counter[0];
    address[2]<=not counter[3];
    address[1]<=counter[2];
    address[0]<=counter[1];
else//block_index=1,5,6
    address[5]<=counter[5];
    address[4]<=counter[4];
    address[3]<=counter[0];
    address[2]<=counter[3];
    address[1]<=counter[2];
    address[0]<=counter[1].

Figure 16:
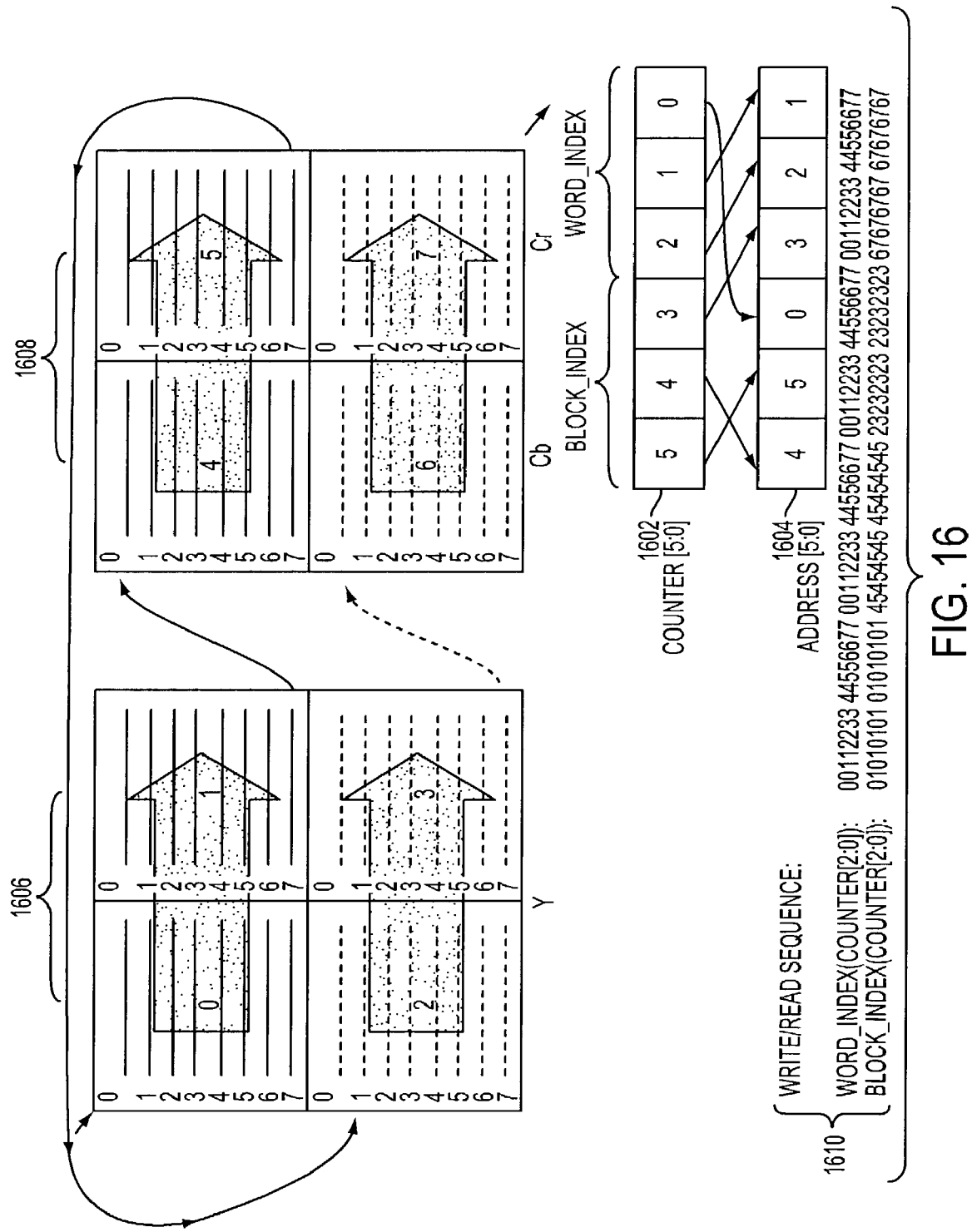
FIG. 16 is a block diagram that illustrates one address pattern sequence that can be used for a 4:2:2 chrominance format.

FIG. 16 is a block diagram that illustrates one address pattern sequence that can be used for a 4:2:2 chrominance format. Block 1606 are the luminance blocks and blocks 1608 are the chrominance blocks. FIG. 16 also shows the counter bits 1602, which six bits, from bit position [5] to bit position [0], are swapped to generate address pattern sequence 1604. Thus, the six counter bits 1602 are rearranged as [4], [5], [0], [3], [2], [1] to generate address pattern sequence 1604. Block 1610 illustrates the block index and word index of sequence 1604 in decimal numbers. Thus, FIG. 16 shows the following:

address[5]<=counter[4];
    address[4]<=counter[5];
    address[3]<=counter[0];
    address[2]<=counter[3];
    address[1]<=counter[2];
    address[0]<=counter[1].

Figure 17:
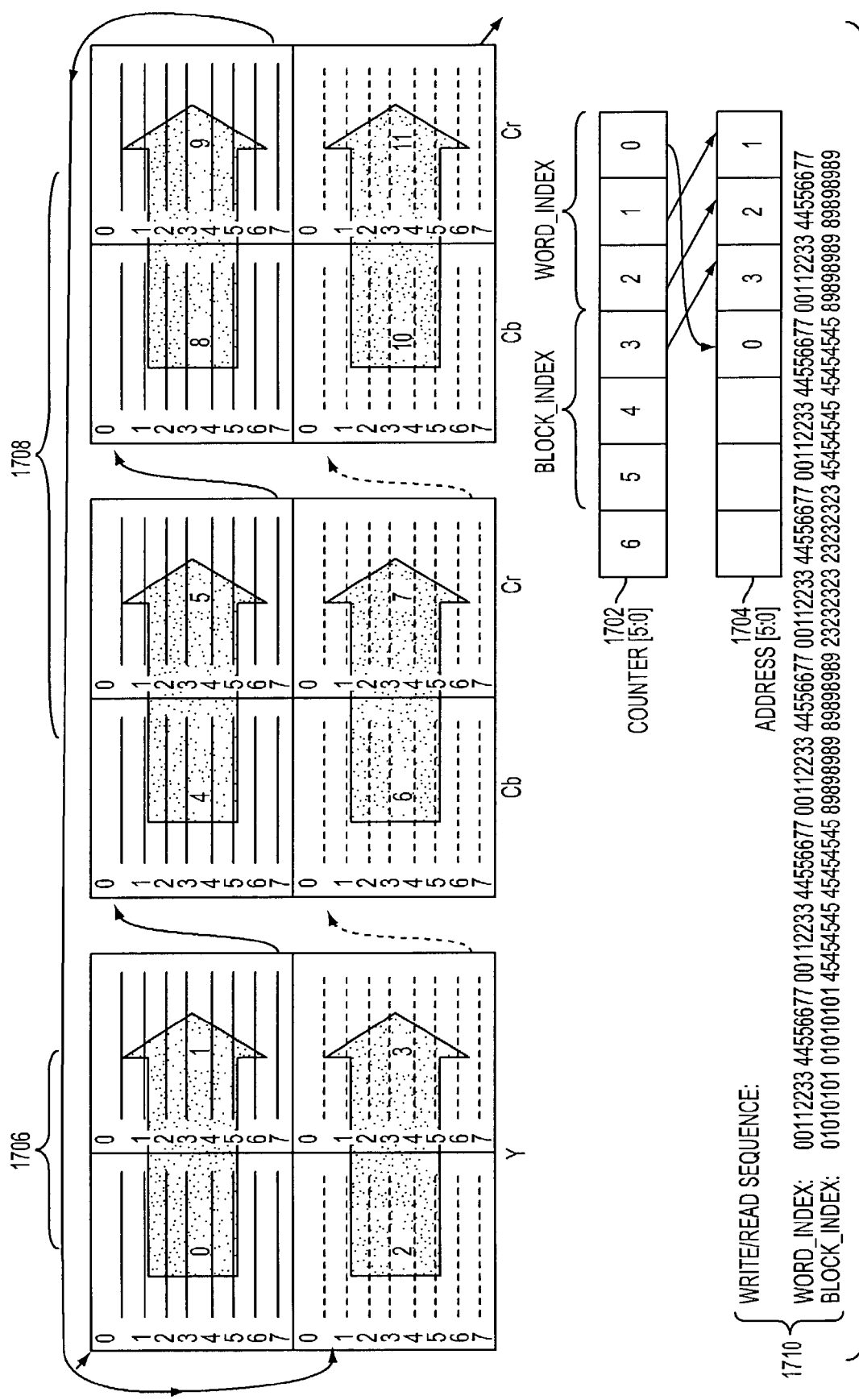
FIG. 17 is a block diagram that illustrates one address pattern sequence that can be used for a 4:4:4 chrominance format.

FIG. 17 is a block diagram that illustrates one address pattern sequence that can be used for a 4:4:4 chrominance format. Block 1706 are the luminance blocks and blocks 1708 are the chrominance blocks. FIG. 17 also shows the counter bits 1702, which bits are swapped to generate address pattern sequence 1704. In FIG. 17, three different bit swap patterns apply to three ranges of sequential sequence generated by a counter. The three ranges are block_index=6, 7, 8, 9, block_index=10, 11, and the remaining, block_index=1, 2, 3, 4, 5.

When counter bits 1702 are in the block_index=6, 7, 8, 9, the seven counter bits 1702, from bit position [6] to bit position [0], are swapped to generate address pattern sequence 1704. The following combinational logic is applied to the seven counter bits 1702. NOT[6], NOT[5], NOT[4], [0], [3], [2], [1] to generate address pattern sequence 1704.

When counter bits 1702 are in the block_index=10, 11, the seven counter bits 1702, from bit position [6] to bit position [0], are swapped to generate address pattern sequence 1704. The seven counter bits 1702 are rearranged as: [6], [5], [4], [0], [3], [2], [1] to generate address pattern sequence 1704.

When counter bits 1702 are in the block_index=1, 2, 3, 4, 5, the seven counter bits 1702, from bit position [6] to bit position [0], are swapped to generate address pattern sequence 1704. The seven counter bits 1702 are rearranged as: [5], [4], [6], [0], [3], [2], [1] to generate address pattern sequence 1704.

Block 1710 illustrates the block index and word index of sequence 1704 in decimal numbers.

Figure 18:
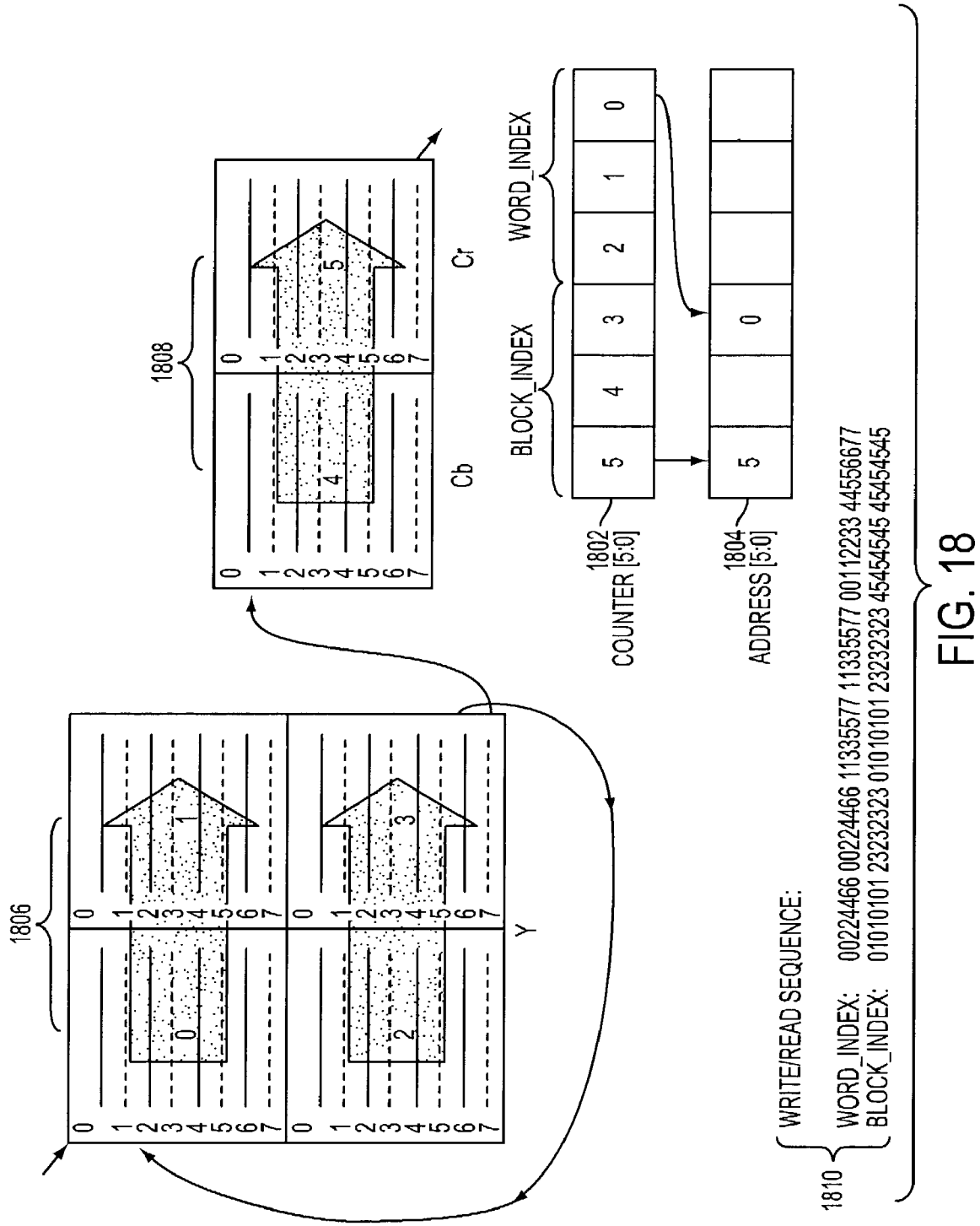
FIG. 18 is a block diagram that illustrates one address pattern sequence that can be used for a 4:2.0 chrominance format.

Thus, with respect to FIG. 17, the following logic applies:
if (counter[6:4]="011" or counter[6:4]="100")//block_index=6,7,8,9
    address[6]<=not counter[6];
    address[5]<=not counter[5];
    address[4]<=not counter[4];
    address[3]<=counter[0];
    address[2]<=counter[3];
    address[1]<=counter[2];
    address[0]<=counter[1];
else if (counter[5:3]="101")//block_index=10,11
    address[6]<=counter[6];
    address[5]<=counter[5];
    address[4]<=counter[4];
    address[3]<=counter[0];
    address[2]<=counter[3];
    address[1]<=counter[2];
    address[0]<=counter[1];
else//block_index=1,2,3,4,5
    address[6]<=counter[5];
    address[5]<=counter[4];
    address[4]<=counter[6];
    address[3]<=counter[0];
    address[2]<=counter[3];
    address[1]<=counter[2];
    address[0]<=counter[1];

FIG. 18 is a block diagram that illustrates one address pattern sequence that can be used for a 4:2:0 chrominance format. Block 1806 are the luminance blocks and blocks 1808 are the chrominance blocks. FIG. 18 also shows the counter bits 1802, which bits are swapped to generate address pattern sequence 1804. In FIG. 18, two different bit swap patterns apply to two ranges of sequential sequences generated by a counter. The two ranges are block_index=0, 1, 2, 3, and the remaining, block_index=5, 6.

When counter bits 1802 are in the block_index=0, 1, 2, 3, the six counter bits 1802, from bit position [5] to bit position [0], are swapped to generate address pattern sequence 1804. The six counter bits 1802 are rearranged as: [5], [3], [0], [2], [1], [4] to generate address pattern sequence 1804.

When counter bits 1802 are in the block_index=5, 6, the six counter bits 1802, from bit position [5] to bit position [0], are swapped to generate address pattern sequence 1804. The six counter bits 1802 are rearranged as: [5], [4], [0], [3], [2], [1] to generate address pattern sequence 1804.

Block 1810 illustrates the block index and word index of sequence 1804 in decimal numbers.

Thus, with respect to FIG. 18, the following logic applies:
if (counter[5]="0")//block_index=0,1,2,3
    address[5]<=counter[5];
    address[4]<=counter[3];
    address[3]<=counter[0];
    address[2]<=counter[2];
    address[1]<=counter[1];
    address[0]<=counter[4];
else//block_index=5,6
    address[5]<=counter[5];
    address[4]<=counter[4];
    address[3]<=counter[0];
    address[2]<=counter[3];
    address[1]<=counter[2];
    address[0]<=counter[1].

Figure 19:
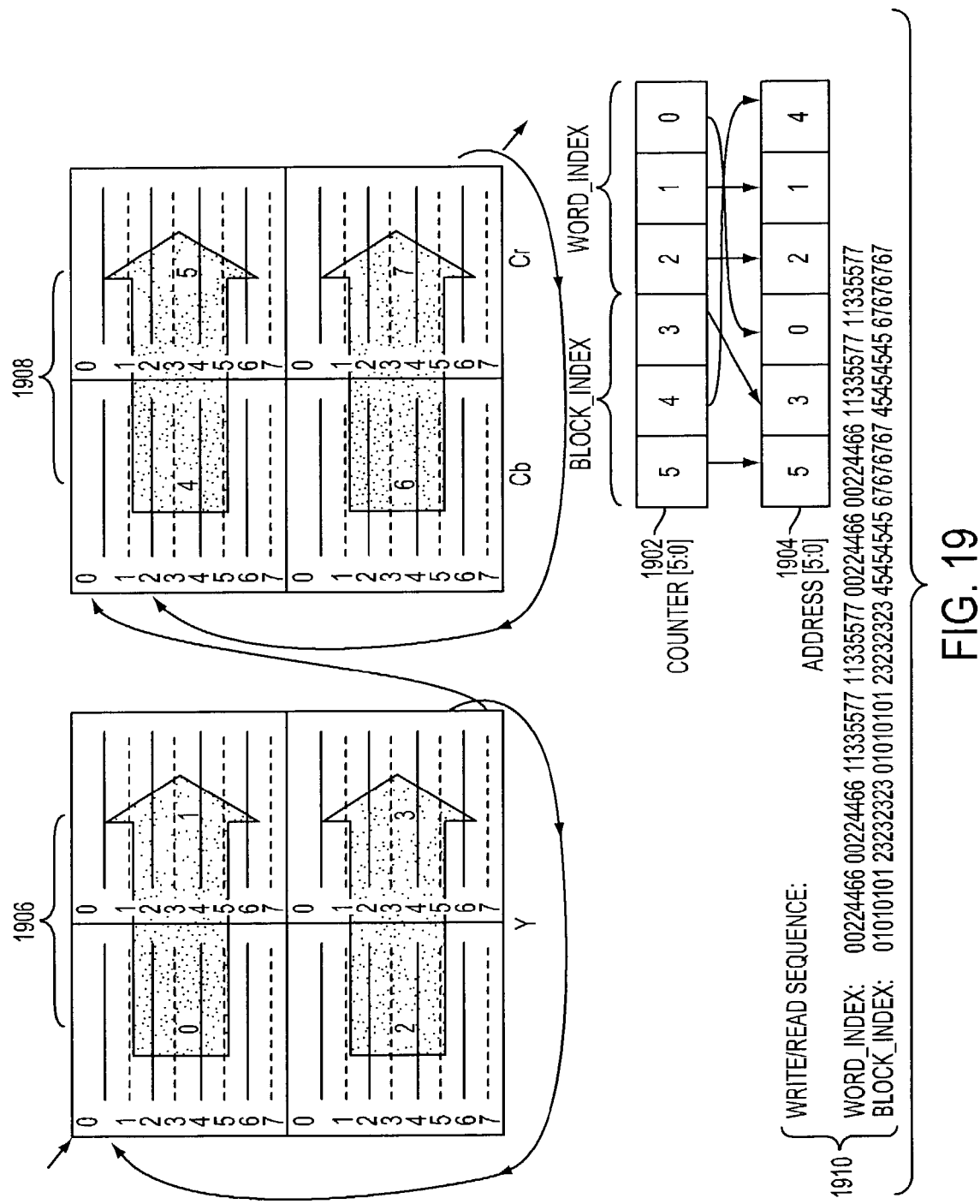
FIG. 19 is a block diagram that illustrates one address pattern sequence that can be used for a 4:2:2 chrominance format.

FIG. 19 is a block diagram that illustrates one address pattern sequence that can be used for a 4:2:2 chrominance format Block 1906 are the luminance blocks and blocks 1908 are the chrominance blocks. FIG. 19 also shows the counter bits 1902, which six bits, from bit position [5] to bit position [0], are swapped to generate address pattern sequence 1904. Thus, the six counter bits 1902 are rearranged as [5], [3], [0], [2], [1], [4] to generate address pattern sequence 1904. Block 1910 illustrates the block index and word index of sequence 1604 in decimal numbers. Thus, FIG. 19 shows the following:
    address[5]<=counter[5];
    address[4]<=counter[3];
    address[3]<=counter[0];
    address[2]<=counter[2];
    address[1]<=counter[1];
    address[0]<=counter[4].

FIG. 20 is a block diagram that illustrates one address pattern sequence that can be used for a 4:4:4 chrominance format. Block 2006 are the luminance blocks and blocks 2008 are the chrominance blocks. FIG. 20 also shows the counter bits 2002, which seven bits, from bit position [6] to bit position [0], are swapped to generate address pattern sequence 2004 Thus, the seven counter bits 2002 are rearranged as [6], [5], [3], [0], [2], [1], [4] to generate address pattern sequence 2004. Block 2010 illustrates the block index and word index of sequence 2004 in decimal numbers. Thus, FIG. 20 shows the following:
    address[6]<=counter[6],
    address[5]<=counter[5];
    address[4]<=counter[3];
    address[3]<=counter[0];
    address[2]<=counter[2];
    address[1]<=counter[1];
    address[0]<=counter[4].

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for decoding a plurality of video frames, the method comprising the steps of:
    using an n-bit counter to generate up to $2^n$ number of distinct bit pattern sequences, wherein n is a positive integer and wherein each of the $2^n$ distinct bit pattern sequences is associated with a distinct binary value comprising n bits;
    generating up to n factorial number of non-sequential bit pattern sequences from the $2^n$ number of distinct bit pattern sequences by swapping a pair of bits in each of the $2^n$ distinct binary values comprising n bits;
    selecting one or more of the n factorial number of non-sequential bit pattern sequences to create one or more corresponding addressing schemes; and fetching and storing data that is associated with the plurality of video frames using the one or more addressing schemes.

2. The method of claim 1, wherein:

the step of using an n-bit counter to generate up to $2^n$ number of distinct bit pattern sequences further comprises the step of using the n-bit counter to produce a first sequence of $2^n$ number of sequential numbers, wherein each of the $2^n$ sequential numbers is associated with a one of the distinct binary values comprising n bits;

the pair of bits in each of the $2^n$ distinct binary values comprised in the step of generating comprises an mth pair of bits, wherein m is an integer that ranges in value from 1 to (n!–1); and the step of swapping the pair of bits in each of the $2^n$ distinct binary values comprised in the step of generating further comprises swapping the mth pair of bits in each binary value to produce an (m1)th sequence of $2^n$ number of non-sequential numbers.

3. The method of claim 1, wherein the step of selecting one or more of the n factorial number of non-sequential bit pattern sequences further comprises the step of using one or more corresponding multiplexers for selecting the one or more of the n factorial number of non-sequential bit pattern sequences.

4. The method of claim 1, wherein the step of selecting one or more of the n factorial number of non-sequential bit pattern sequences further comprises the step of applying a combinational logic to one or more bits of the n-bit counter.

5. The method of claim 1, wherein the one or more addressing schemes is based on one or more corresponding flags and conditions that are associated with the plurality of video frames.

6. A computer-readable medium carrying one or more sequences of instructions for decoding data from a plurality of video frames in a computer system, wherein execution of the one or more sequences of instructions by one or more processors causes the one or more processors to perform the steps of:

using an n-bit counter to generate up to $2^n$ number of distinct bit pattern sequences, wherein n is a positive integer and wherein each of the $2^n$ distinct bit pattern sequences is associated with a distinct binary value comprising n bits;

generating up to n factorial number of non-sequential bit pattern sequences from the $2^n$ number of distinct bit pattern sequences by swapping a pair of bits in each of the $2^n$ distinct binary values comprising n bits;

selecting one or more of the n factorial number of non-sequential bit pattern sequences to create one or more corresponding addressing schemes; and fetching and storing data that is associated with the data from the plurality of video frames using the one or more addressing schemes.

7. An apparatus for decoding a plurality of video frames, comprising:

one n-bit counters, wherein the n-bit counter generates up to $2^n$ number of distinct bit pattern sequences, wherein n is a positive integer;

other address generator circuitry for generating up to n factorial number of non-sequential bit pattern sequences from the $2^n$ number of distinct bit pattern sequences by swapping a pair of bits in each of $2^n$ respectively associated distinct binary values comprising n bits; and one or more multiplexers corresponding to the n-bit counters for selecting one or more of the n factorial number of non-sequential bit pattern sequences to create one or more corresponding addressing schemes associated with the plurality of video frames.

8. The apparatus of claim 7, further comprising one or more motion compensation units that are associated with the n-bit counters and the one or more corresponding multiplexers.

9. The apparatus of claim 7, further comprising one or more merge-and-store units that are associated with the n-bit counters and the one or more corresponding multiplexers.

10. The apparatus of claim 7, further comprising one or more intracoded direct cosine units that are associated with the n-bit counters and the one or more corresponding multiplexers.

11. The apparatus of claim 7, wherein:

the one or more corresponding addressing schemes are used for fetching and storing data that is associated with the plurality of video frames.

12. The method of claim 7, wherein the one or more addressing schemes is based on corresponding one or more flags and conditions that are associated with the plurality of video frames.

* * * * *